United States Patent
Gupta et al.

(10) Patent No.: US 12,339,755 B2
(45) Date of Patent: *Jun. 24, 2025

(54) FAILOVER METHODS AND SYSTEM IN A NETWORKED STORAGE ENVIRONMENT

(71) Applicant: NETAPP, INC., San Jose, CA (US)

(72) Inventors: Ratnesh Gupta, Dublin, CA (US); Kalaivani Arumugham, Sunnyvale, CA (US); Ram Kesavan, Los Altos, CA (US); Ravikanth Dronamraju, Pleasanton, CA (US)

(73) Assignee: NETAPP, INC., San Jose, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 18/208,478

(22) Filed: Jun. 12, 2023

(65) Prior Publication Data
US 2023/0325289 A1 Oct. 12, 2023

Related U.S. Application Data

(63) Continuation of application No. 17/648,531, filed on Jan. 20, 2022, now Pat. No. 11,714,731, which is a
(Continued)

(51) Int. Cl.
*G06F 11/20* (2006.01)
*G06F 11/16* (2006.01)

(52) U.S. Cl.
CPC ...... *G06F 11/2069* (2013.01); *G06F 11/1662* (2013.01); *G06F 11/2064* (2013.01);
(Continued)

(58) Field of Classification Search
CPC ............. G06F 11/2069; G06F 11/1662; G06F 11/2064; G06F 11/2058; G06F 11/2071; G06F 11/2082; G06F 2201/82
See application file for complete search history.

(56) References Cited

U.S. PATENT DOCUMENTS 8,689,043 B1 4/2014 Bezbaruah et al.
10,503,612 B1 * 12/2019 Wang ................... G06F 11/2023
(Continued)

OTHER PUBLICATIONS

NetApp, Inc., "Clustered Data ONTAP 8.2," High-Availability Configuration Guide, updated for 8.2.1, Feb. 2014, 108 pages.
(Continued)

*Primary Examiner* — Bryce P Bonzo
*Assistant Examiner* — Michael Xu
(74) *Attorney, Agent, or Firm* — LOZA & LOZA, LLP

(57) ABSTRACT

Failover methods and systems for a storage environment are provided. During a takeover operation to take over storage of a first storage system node by a second storage system node, the second storage system node copies information from a first storage location to a second storage location. The first storage location points to an active file system of the first storage system node, and the second storage location is assigned to the second storage system node for the takeover operation. The second storage system node quarantines storage space likely to be used by the first storage system node for a write operation, while the second storage system node attempts to take over the storage of the first storage system node. The second storage system node utilizes information stored at the second storage location during the takeover operation to give back control of the storage to the first storage system node.

20 Claims, 14 Drawing Sheets

Related U.S. Application Data continuation of application No. 17/026,785, filed on Sep. 21, 2020, now Pat. No. 11,249,869.

(52) U.S. Cl.
CPC ...... *G06F 11/2058* (2013.01); *G06F 11/2071* (2013.01); *G06F 11/2082* (2013.01); *G06F 2201/82* (2013.01)

(56) References Cited

U.S. PATENT DOCUMENTS

| | | |
|---|---|---|
| 11,249,869 B1 | 2/2022 | Gupta et al. |
| 2015/0309892 A1 | 10/2015 | Ramasubramaniam et al. |
| 2016/0239437 A1 | 8/2016 | Le et al. |
| 2017/0052707 A1* | 2/2017 | Koppolu ............... G06F 3/0683 |
| 2017/0235591 A1 | 8/2017 | Kanada et al. |
| 2017/0286238 A1 | 10/2017 | Kesavan et al. |
| 2021/0073089 A1 | 3/2021 | Sathavalli et al. |
| 2021/0081287 A1 | 3/2021 | Koning et al. |
| 2021/0157694 A1 | 5/2021 | Dye et al. |
| 2021/0286515 A1* | 9/2021 | Gazit ................... G06F 3/0655 |
| 2021/0303423 A1* | 9/2021 | MacCarthaigh .... G06F 11/2025 |
| 2021/0334181 A1* | 10/2021 | Satoyama ............... G06F 16/10 |
| 2022/0147428 A1 | 5/2022 | Gupta et al. |

OTHER PUBLICATIONS

Notice of Allowance mailed on Mar. 29, 2023 for U.S. Appl. No. 17/648,531, filed Jan. 20, 2022, 8 pages.

\* cited by examiner

FAILOVER METHODS AND SYSTEM IN A NETWORKED STORAGE ENVIRONMENT

CROSS-REFERENCE TO RELATED APPLICATIONS

This patent application claims priority of and is a continuation of U.S. patent application Ser. No. 17/648,531, filed on Jan. 20, 2022, which is a continuation of U.S. patent application Ser. No. 17/026,785, filed on Sep. 21, 2020, now U.S. Pat. No. 11,249,869, issued on Feb. 15, 2022, the entire disclosures of which are incorporated herein by reference.

TECHNICAL FIELD

The present disclosure generally relates to networked storage systems, and more particularly, to innovative computing technology for efficiently executing failover related operations.

BACKGROUND

Various forms of storage systems are used today. These forms include direct attached storage, network attached storage (NAS) systems, storage area networks (SANs), and others. Storage systems are commonly used for a variety of purposes, such as providing multiple users with access to shared data, backing up data and others. A storage system typically includes at least one computing system (may also be referred to as a "server", "storage server", "storage node", "storage system node" or "storage controller") executing a storage operating system configured to store and retrieve data on behalf of one or more computing systems at one or more storage devices.

To provide redundancy in networked storage systems, a first storage system node and a second storage system node may be configured to operate as partner nodes within a multi-node cluster. This means that all write operations managed by the first storage system node are mirrored at the second storage system node, and vice versa. If the first storage system node becomes unresponsive, then the second storage system node takes over the storage of the failed first storage system node by executing a failover (also referred to as "takeover" throughout this specification) operation.

During takeover, in conventional systems, the second storage system node makes a reservation on the storage managed by the first storage system node to prevent the first storage system node or any other node to write any data during the takeover operation. One reservation technique is provided by the Small Computer System Interface (SCSI)-3 specification. During a SCSI-3 reservation, an initiating node sends a storage reservation request to reserve a logical unit number (LUN). This prevents another node to make any changes to the LUN. This is undesirable because the SCSI-3 reservation may delay takeover. Furthermore, in a multi-node cluster with multiple nodes, the reservation limits a third storage system node's ability to write to the reserved storage. Continuous efforts are being made to improve computing technology for efficiently executing failover operations.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

Figure 1A:
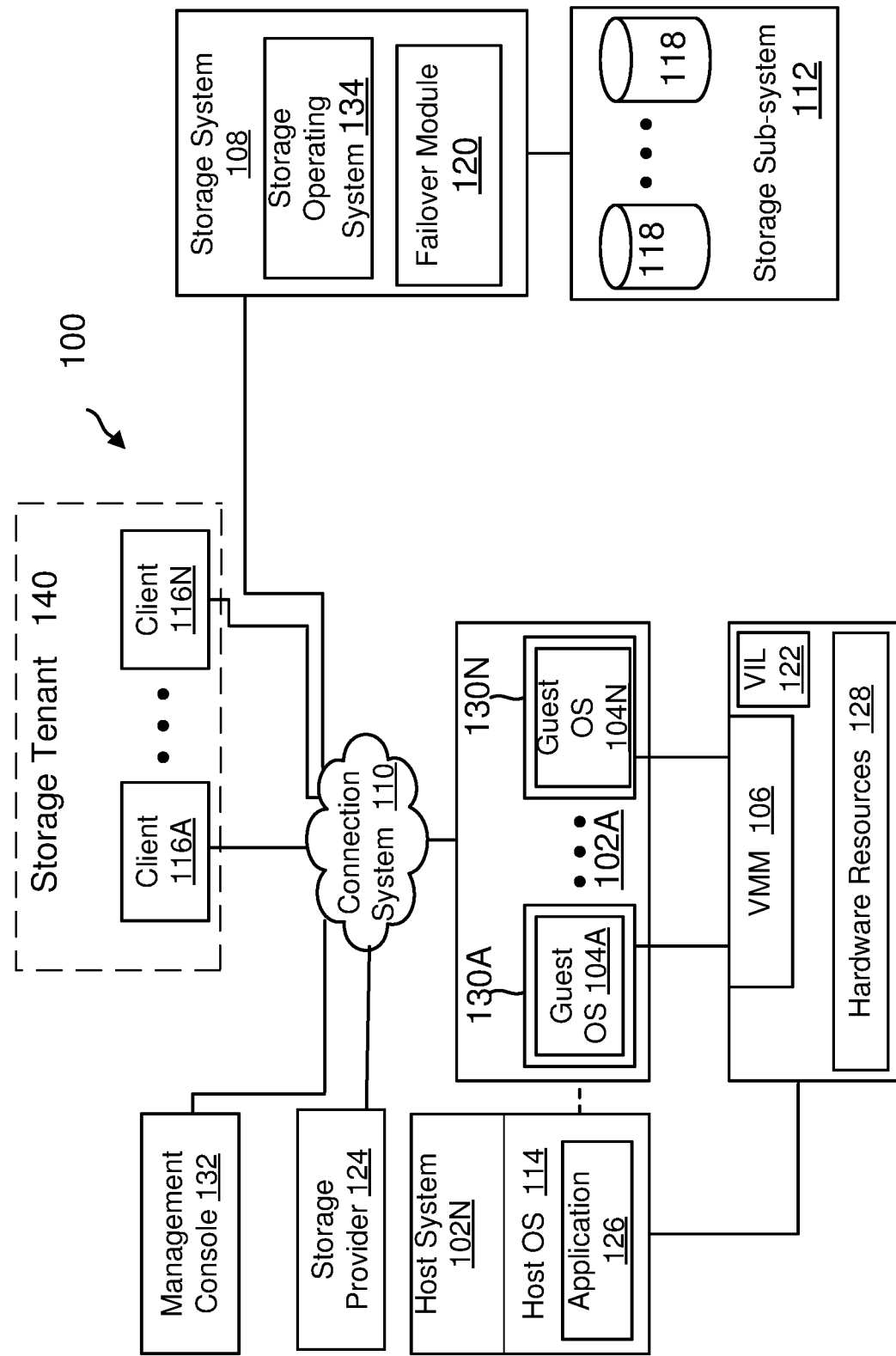
FIG. 1A shows an example of an operating environment for various aspects of the present disclosure.

The present disclosure generally relates to networked storage systems, and more particularly, to innovative computing technology for efficiently executing failover related operations in a networked storage system having a plurality of storage system nodes. As described below in detail, each storage system node uses logical storage objects (e.g. a storage volume, a logical unit number (LUN) or any other logical object) to store information in and retrieve information from one or more storage devices. The storage space at the storage devices is represented by one or more "aggregates," and within each aggregate one or more storage volumes/LUNs are created. Each storage system node has access to one or more aggregates to store and retrieve information i.e. the storage system node owns the "storage." To store and retrieve information, a computing device, typically issues write and/or read requests to a storage system node. Based on the request type (i.e. write or read request), the storage system node stores information at storage space within one or more aggregate or retrieves information.

To provide redundancy in the networked storage system, a first storage system node and a second storage system node may be configured to operate as partner nodes, each node having access to its own assigned storage space. This means that information written by the first storage system node using a first logical storage object is mirrored at the second storage system node, using a second logical storage object, and vice versa. If the first storage system node becomes unresponsive or fails, then a failover operation is triggered. The failover operation can also be initiated based on a user request, without detecting any failure or potential failure.

During the failover operation, a logical interface provided by the first storage system node to client systems maybe migrated to the second storage system node. The logical interface is used by client system to communicate with the first storage system node (i.e. send read and write requests). Thereafter, a takeover operation is initiated. During the takeover operation, the second storage system node "takes" over the storage (i.e. the aggregate) of the first storage system node. The term "takes" over in this context means that the second storage system node becomes the "owner" of the first storage system node's storage so that it can process all read and write requests that are sent to the first storage system node. The term takeover operation and failover operation maybe used interchangeably throughout this specification. Although the above example is based on two storage system nodes, in a system with more than two nodes, a third storage system node may be configured to take over the first and/or the second storage system node.

In conventional systems, during the takeover operation, the second storage system node makes a reservation on a first logical storage object (e.g. a LUN) of the first storage system node. The reservation is made to prevent the first storage system node or any other node to write any data using the LUN, while the second storage system is taking over the storage of the first storage system node. One reservation technique is provided by the Small Computer System Interface (SCSI)-3 specification. During a SCSI-3 persistent reservation, the second storage system node sends a reservation request to reserve the LUN owned by the first storage system node. Once the request is granted, it prevents another node to make any changes to the LUN or write any data. This is undesirable because executing the SCSI-3 reservation process delays takeover by the second storage system node. Furthermore, in a multi-node cluster with multiple nodes, the reservation also limits a third storage system node's ability to write to the reserved LUN. As described below in detail, the adaptive aspects of the present disclosure overcome the shortcomings of the SCSI-3 reservation process and enables the takeover operation without making a reservation on the LUN of the first storage system node.

In one aspect, each of the plurality of storage system nodes is assigned a set of storage locations in one or more storage devices. A first storage location of each storage system node stores information, e.g. a pointer that points to an active file system of each of the storage system node. The first storage location includes one or more storage blocks to store the information that points to the active file system. These storage blocks are referred below as "super blocks" and shown as SB1/SB2 in FIG. 1C. The term "super block" in this context means a storage location that stores information to access the active file system. Therefore, super blocks, SB1 and SB2 can be referred to as storage locations or storage blocks for storing a pointer to the active file system.

Each storage system node maintains information at the first storage location during normal operation i.e. prior to a takeover operation.

A second storage location is also assigned to each storage system node. The second storage location includes one or more storage blocks that are used during the takeover operation by the storage system node (e.g. the second storage system node) that is taking over storage of another storage system node (e.g. the first storage system node). The storage blocks of the second storage location are referred below as SB3/SB4 (see FIG. 1C).

In one aspect, as an example, during a takeover operation to take over storage of the first storage system node by the second storage system node, the second storage system node copies information from a first storage location (i.e. SB1/SB2) of the first storage system node to a second storage location ((i.e. SB3/SB4) assigned to the second storage system node. The first storage location directly or indirectly points to an active file system of the first storage system node as well as other configuration information, prior to the takeover operation. By copying the information, the second storage system node can access information related to the storage of the first storage system node and the active file system maintained by the first storage system node, before the takeover operation. The second storage system node also quarantines (or isolates/fences off) storage space likely to be used by the first storage system node for any write operations, while the second storage system node attempts to take over the storage of the first storage system node. The second storage system node predicts the storage space likely to be used by the first storage system node, based on a pattern of write requests processed by the first storage system node, prior to the takeover operation. The second storage system node then utilizes information stored at the second storage location, during the takeover operation, to take over the storage of the first storage system node, as described below in detail. In one aspect, the takeover operation is executed using the first and second storage locations, without making any SCSI-3 reservations. This makes the takeover operation more efficient and no storage space is exclusively reserved for the takeover operation.

Upon take over in the above example, the second storage system node manages the storage resources of the taken over, first storage system node, until the first storage system node becomes healthy again (i.e. becomes responsive again). Thereafter, a "giveback" operation is performed during which the second storage system node gives back control of the storage that was taken over during the takeover operation. During the giveback operation, the second storage system node copies content of the second storage location to the first storage location of the first storage system node to give back the taken over storage to the first storage system node. The quarantined storage space is released, and the first storage system node utilizes the copied information to take back its storage resources (i.e. it is able process read and write requests using the storage given back by the second storage system node), as described below in detail.

As a preliminary note, the terms "component", "module", "system," and the like as used herein are intended to refer to a computer-related entity, either software-executing general-purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, storage class memory, solid state drive, EEPROM (electrically erasable programmable read only memory), memory stick or any other storage device type, in accordance with the claimed subject matter.

System 100: FIG. 1A shows an example of a networked storage environment 100 (also referred to as system 100), for implementing the various adaptive aspect of the present disclosure. System 100 may include a plurality of computing devices 102A-102N (may also be referred to as a "host system 102," "host systems 102", "computing device 102", "computing devices 102", "server 102" or "servers 102") communicably coupled via a connection system 110 (e.g. a local area network (LAN), wide area network (WAN), the Internet and others) to a storage system 108 (may also be referred to as "storage server 108", "storage controller 108", "storage node 108", "storage nodes 108", "storage system node 108" or "storage system nodes 108") that executes a storage operating system 134 for storing and retrieving data to and from a storage subsystem 112 having mass storage devices 118. As used herein, the term "communicably coupled" may refer to a direct connection, a network connection, or other connections to enable communication between devices Although only a single storage system 108 is shown in FIG. 1A, according to aspects of the present disclosure, system 100 may include a plurality of storage systems 108 arranged in one or more high-availability pairs (see FIG. 1B/1C/FIG. 2A) for a failover operation. The storage system 108 also executes a failover module 120 for managing a failover operation, described below in detail.

As an example, host system 102A may execute a plurality of virtual machines (VMs) in a virtual environment that is described below in detail. Host 102N may execute one or more application 126, for example, a database application, an email application or any other application type to use the storage system 108 for storing information in storage devices 118. Host 102N executes an operating system 114, for example, a Windows based operating system, Linux, Unix and others (without any derogation of any third-party trademark rights) to control the overall operations of host 102N.

Clients 116A-116N are computing devices that can access storage space at the storage system 108 via the connection system 110. A client can be the entire system of a company, a department, a project unit or any other entity. Each client is uniquely identified and, optionally, may be a part of a logical structure called a storage tenant 140. The storage tenant 140 represents a set of users (may be referred to as storage consumers) for a storage provider 124 (may also be referred to as a cloud manager, where cloud computing is utilized) that provides access to storage system 108. It is noteworthy that the adaptive aspects of the present disclosure are not limited to using a storage provider or a storage tenant, and instead, may be implemented for direct client access.

In one aspect, the storage operating system 134 has access to storage devices 118 of the storage subsystem 112. The storage devices 118 may include solid state drives (SSDs), storage class memory, writable storage device media such as hard disk drives (HDD), magnetic disks, video tape, optical, DVD, magnetic tape, and/or any other similar media adapted to store electronic information. The storage devices 118 may be organized as one or more groups of Redundant Array of Independent (or Inexpensive) Disks (RAID). The various aspects disclosed are not limited to any specific storage device type or storage device configuration.

As an example, the storage operating system 134 may provide a set of logical storage volumes (or logical unit numbers (LUNs)) that present storage space to host systems 102, clients 116, and/or VMs (e.g. 130A/130N, described below) for storing information. Each volume may be configured to store data containers (e.g. files, directories, structured or unstructured data, or data objects), scripts, word processing documents, executable programs, and any other type of structured or unstructured data. From the perspective of one of the client systems, each volume can appear to be a single drive. However, each volume can represent storage space at one storage device, an aggregate of some or all of the storage space in multiple storage devices, a RAID group, or any other suitable set of storage space.

An example of storage operating system 134 is the Data ONTAP® storage operating system available from NetApp, Inc. that implements a Write Anywhere File Layout (WAFL®) file system (without derogation of any trademark rights of NetApp Inc.). The various aspects disclosed herein are not limited to any specific file system type and maybe implemented by other file systems and storage operating systems.

The storage operating system 134 organizes storage space at the storage subsystem 112 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 118. A request to store or read data may be based on file-based access protocols, for example, the Common Internet File System (CIFS) protocol or Network File System (NFS) protocol, over TCP/IP (Transmission Control Protocol/Internet Protocol). Alternatively, the request may use block-based access protocols, for example, iSCSI (Internet Small Computer Systems Interface) and SCSI encapsulated over Fibre Channel (FCP). The term file/files as used herein include data container/data containers, directory/directories, and/or data object/data objects with structured or unstructured data.

To facilitate access to storage space, the storage operating system 134 implements a file system (also referred to as file system manager 240, FIG. 2B) that logically organizes stored information as a hierarchical structure for files/directories/objects at the storage devices. Each "on-disk" file may be implemented as a set of data blocks configured to store information, such as text, whereas a directory may be implemented as a specially formatted file in which other files and directories are stored. The data blocks are organized within a volume block number (VBN) space that is maintained by the file system, described below in detail. The file system may also assign each data block in the file a corresponding "file offset" or the block number (FBN). The file system typically assigns sequences of FBNs on a per-file basis, whereas VBNs are assigned over a larger volume address space. The file system organizes the data blocks within the VBN space as a logical volume. The file system typically consists of a contiguous range of VBNs from zero to n, for a file system of size n−1 blocks.

The storage operating system 134 may further implement a storage module (for example, a RAID system for the storage subsystem 112) that manages the storage and retrieval of the information to and from storage devices 118 in accordance with input/output (I/O) operations. When accessing a block of a file in response to servicing a client request, the file system specifies a VBN that is translated at the file system/RAID system boundary into a disk block number ("DEN") (or a physical volume block number ("PVBN") location on a particular storage device (storage device, DBN) within a RAID group of the physical volume). Each block in the VBN space and in the DIN space maybe fixed, e.g., 4 k bytes (kB), in size; accordingly, there is typically a one-to-one mapping between the information stored on the storage devices in the DBN space and the information organized by the file system in the VBN space.

A requested block is retrieved from one of the storage devices 118 and stored in a buffer cache (e.g. 140, FIG. 1B) of a memory of the storage system 108 as part of a buffer tree (e.g. 400, FIG. 4) of the file. The buffer tree is an internal representation of blocks for a file stored in the buffer cache and maintained by the file system. Broadly stated and as described below in detail, the buffer tree has an inode at the root (top-level) of the file.

An inode is a data structure used to store information, such as metadata, about a file, whereas the data blocks are structures used to store the actual data for the file. The information in an inode may include, e.g., ownership of the file, file modification time, access permission for the file, size of the tile, file type and references to locations on storage devices 118 of the data blocks for the file. The references to the locations of the file data are provided by pointers, which may further reference indirect blocks (e.g. 404, FIG. 4) that, in turn, reference the data blocks (e.g. 406, FIG. 4), depending upon the amount of data in the file. Each pointer may be embodied as a VBN to facilitate efficiency among the file system and the RAID system when accessing the data.

Volume information ("volinfo") and file system information ("fsinfo") blocks specify the layout of information in the file system, the latter block including an inode of a file that includes all other inodes of the file system (the inode file). Each logical volume (file system) has an fsinfo block that is preferably stored at a fixed location, e.g., at a RAID group. The inode of the fsinfo block may directly reference (or point to) blocks of the inode file or may reference indirect blocks of the inode file that, in turn, reference direct blocks of the inode file. Within each direct block of the inode file are embedded inodes, each of which may reference indirect blocks that, in turn, reference data blocks (also mentioned as "L0" blocks) of a file. An example of an inode and a buffer tree are described below with respect to FIG. 4.

The storage operating system 134 also maintains storage blocks, referred to as super blocks that point to the volinfo and fsinfo blocks, and hence indirectly point to an active file system maintained by the storage operating system 134. The super blocks are dedicated storage locations that can be used to access an active file system at any given time. It is noteworthy that the term "super block" maybe used interchangeably with the fsinfo block. Details regarding using the super blocks are provided below.

In a typical mode of operation, a computing device (e.g. host system 102, client 116 or any other device) transmits one or more I/O requests over connection system 110 to the storage system 108. Storage system 108 receives the I/O requests, issues one or more I/O commands to storage devices 118 to read or write data on behalf of the computing device, and issues a response containing the requested data over the network 110 to the respective client system.

As mentioned above, system 100 may also include a virtual machine environment where a physical resource is time-shared among a plurality of independently operating processor executable virtual machines (VMs). Each VM may function as a self-contained platform, running its own operating system (OS) and computer executable application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host system), which may be referred to herein as "host hardware resources". The host hardware resources may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

As shown in FIG. 1A, host system 102A includes/provides a virtual machine environment executing a plurality of VMs 130A-130N (may also be referred to as VM 130 or VMs 130) that may be presented to client computing devices/systems 116A-116N. VMs 130 execute a plurality of guest OS 104A-104N (may also be referred to as guest OS 104) that share hardware resources 128. Application 126 may also be executed within VMs 130 to access the storage system 108. As described above, hardware resources 128 may include storage, CPU, memory, I/O devices or any other hardware resource.

In one aspect, host system 102A interfaces with or includes a virtual machine monitor (VMM) 106, for example, a processor executed Hyper-V layer provided by Microsoft Corporation of Redmond, Washington, a hypervisor layer provided by VMWare Inc., or any other type (without derogation of any third party trademark rights). VMM 106 presents and manages the plurality of guest OS 104A-104N executed by the host system 102A. The VMM 106 may include or interface with a virtualization layer (VIL) 122 that provides one or more virtualized hardware resource to each OS 104A-104N.

In one aspect, VMM 106 is executed by host system 102A with VMs 130. In another aspect, VMM 106 may be executed by an independent stand-alone computing system, referred to as a hypervisor server or VMM server and VMs 130 are presented at one or more computing systems.

It is noteworthy that different vendors provide different virtualization environments, for example, VMware Inc., Microsoft Corporation and others. Data centers may have hybrid virtualization environments/technologies, for example, Hyper-V and hypervisor based virtual environments. The generic virtualization environment described above with respect to FIG. 1A may be customized to implement the various aspects of the present disclosure. Furthermore, VMM 106 (or VIL 122) may execute other modules, for example, a storage driver, network interface and others. The virtualization environment may use different hardware and software components and it is desirable for one to know an optimum/compatible configuration.

In one aspect, system 100 uses a management console 132 for configuring and managing the various components of system 100. As an example, the management console 132 may be implemented as or include one or more application programming interfaces (APIs) that are used for managing one or more components of system 100. The APIs may be implemented as REST APIs, where REST means "Representational State Transfer". REST is a scalable system used for building web services. REST systems/interfaces may use HTTP (hyper-text transfer protocol) or other protocols for communicating with one or more devices of system 100.

Although storage system 108 is shown as a stand-alone system, i.e. as a non-cluster based system, in another aspect, storage system 108 may have a distributed architecture, for example, a cluster based storage system that is described below in detail with respect to FIG. 2A.

Figure 1B:
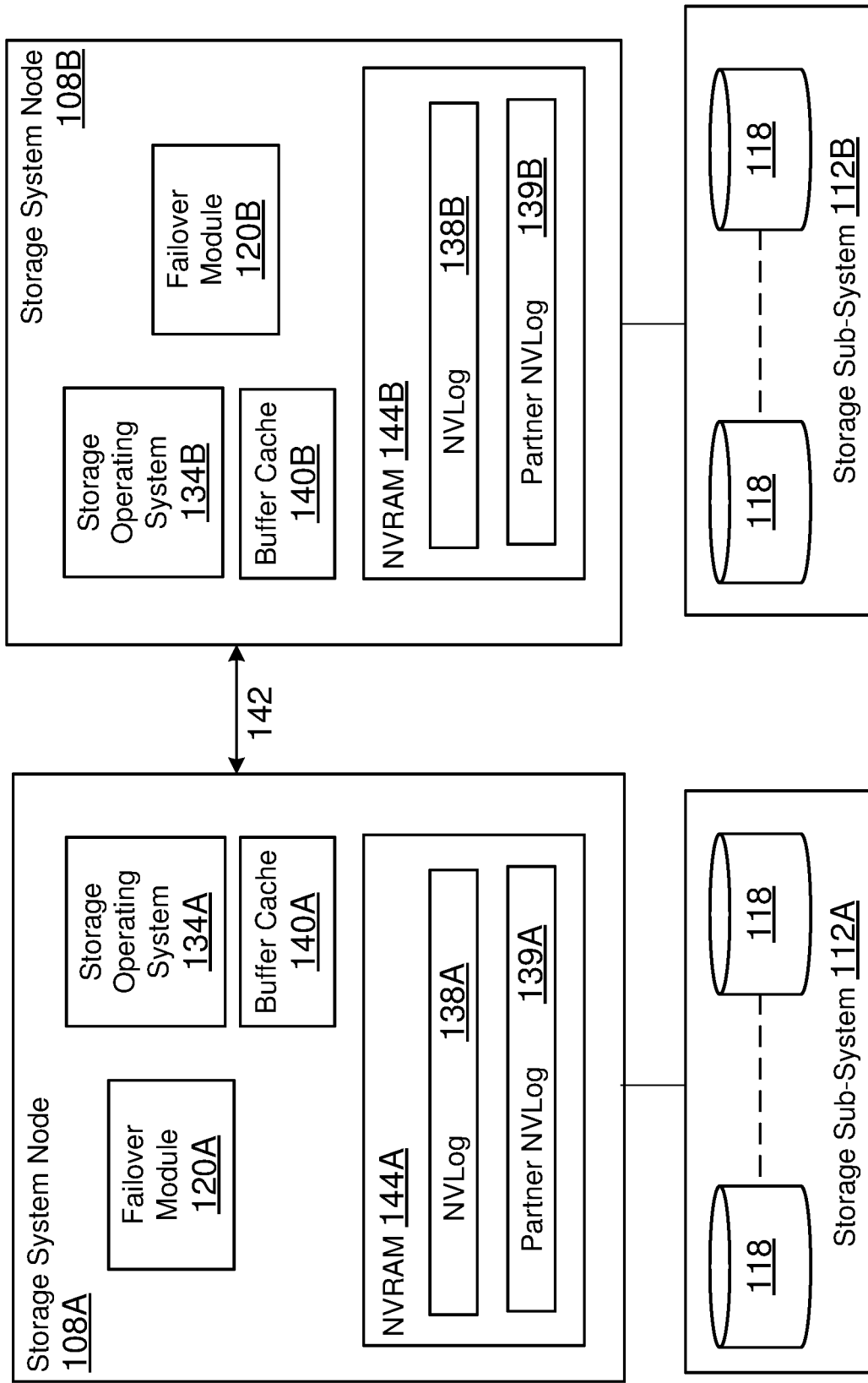
FIG. 1B shows an example of two storage system nodes operating as partner nodes, according to aspects of the present disclosure.

High-Availability Pair: FIG. 1B shows an example of storage system nodes 108A/108B connected by a link 142 (e.g. a communication link or any other interconnect type) configured to operate as partner nodes. This means that any data written by one storage system node (e.g. 108A) is mirrored at the partner storage system node (e.g. 108B). If one storage system node (e.g. 108A) fails or becomes unresponsive, then the other storage system node (e.g. 108B) takes over the storage volumes/LUNs of the failed storage system node, during a takeover operation. Once the storage system node 108A returns to normal operation, during a giveback operation, the storage system node 108B gives back control of the storage volumes/LUNs that were taken over during the takeover operation.

Each storage system node 108A/108B executes the storage operating system 134 (shown as 134A for storage system node 108A, and 134B for storage system node 108B). The storage operating system 134 uses a volatile, buffer cache 140 (shown as buffer cache 140A for storage system 108A, and buffer cache 140B for storage system 140B) for managing write and read requests.

To protect against failures, each storage system node uses a non-volatile random access memory (NVRAM) 144 (shown as NVRAM 144A for the storage system node 108A, and NVRAM 144B for the storage system node 108B) that persistently stores a log, referred to as "NVLog", to track each write operation that is being processed by the buffer cache 140 of each storage system node at any given time. For example, NVLog 138A tracks all the write operations that are buffered in buffer cache 140A of storage system node 108A. A partner NVLog 139A tracks all the write operations that are being processed by the partner storage system node 108B at buffer cache 140B. Similarly, the NVLog 138B tracks all the write operations that are buffered in buffer cache 140B, and the partner NVLog 139B tracks all the write operations of buffer cache 140A that are being processed by the storage system node 108A at any given time. Although for clarity, NVLogs 138A/138B and partner NVLogs 139A/139B are shown as separate logical structures within NVRAMs 144A/144B, the adaptive aspects of the present disclosure maybe implemented by maintaining a single NVLog at each storage system node to track the write operations processed by each node.

During a failover operation, before the storage volumes of a failed storage system node (e.g. 108A) can be made available to incoming read and write requests, a partner storage system node (e.g. 108B) replays (i.e. processes) all the entries mirrored in the partner NVLog 139B to ensure that all the mirrored write requests at the time of failure are executed. The failover operation is managed by the failover module 120 (i.e. 120A for the storage system node 108A and 120B for the storage system 108B) interfacing with the storage operating system 134. Failover module 120 may be integrated with the storage operating system 134.

Figure 1C:
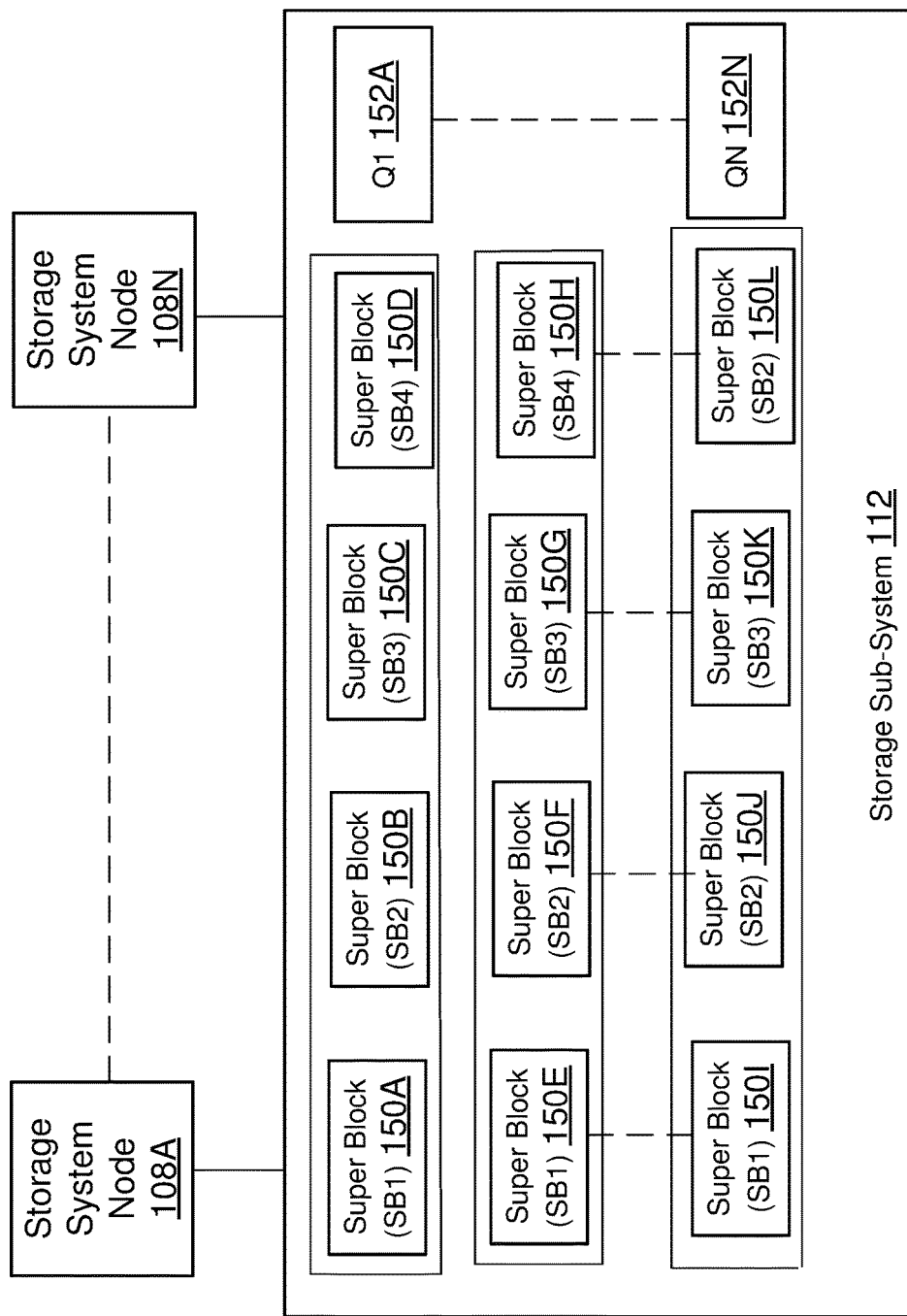
FIG. 1C shows an example of configuring storage locations for managing failover and giveback operations, according to aspects of the present disclosure.

Although only two storage system nodes are shown in FIG. 1B, multiple nodes may be configured to take over each other's storage during a failover operation. For example, as shown in FIG. 1C, a networked storage system may have a plurality of storage system nodes 108A-108N. During a failover operation, if the storage system node 108B fails, while attempting to take over the storage of the storage system node 108A, another storage system node (e.g. 108N) can take over the storage system node 108B, as described below.

In one aspect, innovative technology is provided to efficiently execute a takeover operation, without making a reservation for the storage that is being taken over. In one aspect, at least a set of four storage locations are assigned to each storage system node that is configured to take over another storage system node in a multi-node, networked, storage environment. For example, storage blocks (referred to as super blocks and shown as SB1 and SB2) 150A/150B) are used by the storage system node 108A to store a pointer to point to a fsinfo block. This enables a file system to traverse a tree structure of the active file system of the first storage system node 108A. When data is written, the tree structure is updated, which updates the fsinfo block, hence SB1 150A/SB2 150B always indirectly point to the latest version of the active file system. Instead of pointing to the fsinfo blocks, SB1 150A and SB2 150B may be configured as the fsinfo blocks. SB3 150C and SB4 150D are storage locations that are used by the storage system node 108A, during a failover operation to take over storage of another storage system node, as described above.

Similar to SB1 150A and SB150B, SB1 150E and SB2 150F are assigned to the storage system node 108B for use during normal file system operations, while SB3 150G and SB4 150H are used by the second storage system node 108B during a failover operation. SB1 150I and SB2 150J are assigned to the storage system node 108N for use during normal file system operations. SB3 150K and SB4 150L are used by the storage system node 108N during a failover operation.

Furthermore, each storage system node 108A-108N may include or use one or more active file systems. Each file system may be assigned a set of blocks (e.g. SB1 150A/SB2 150B). When a storage system node (e.g. 108A) is operational, it uses its dedicated storage blocks (e.g. 150A/150B) and upon takeover, the node that takes over (e.g. 108B), copies the information from SB1 150A/SB2 150B to SB3 150G/SB4 150H of storage system node 108B.

In yet another example, assume that each storage system manages two active file systems, and if the storage system node 108A fails, then the storage system node 108B can take over the first file system of the first storage system node 108A by using SB3 150G/SB4 150H, while the storage system node 108N takes over the second file system of the storage system node 108B using super blocks 150K/150L.

The number of designated SB3/SB4 blocks and any other blocks used by different storage operating system's subsystems (e.g. a RAID label) within the storage sub-system 112 vary based on the number of storage system nodes configured to take over another node during a cascading failure. For example, example, assume that storage system 108B and 108N are configured to take over the storage system node 108A. If the storage system node 108A becomes unresponsive, first the storage system node 108B attempts to take over the storage system node 108A. If the storage system node 108B is unable to takeover, then the storage system node 108N takes over the storage system node 108A. To handle this cascading failure, each storage system node can be assigned multiple pairs of SB3/SB4 blocks. The number of SB3/SB4 blocks will depend on how many storage system nodes a storage system node is configured to take over. For example, if a storage system node is configured to take over two other nodes, then the storage system node is assigned two pairs of SB3/SB4 blocks. The SB3/SB4 blocks are assigned when a storage system node is configured as a partner node that can take over another storage system node.

Although FIG. 1C shows a set of four super-blocks (i.e. SB1/SB2/SB3/SB4) for each storage system node, the adaptive aspects of the present disclosure may include more than four super-blocks per storage system node, especially, when one storage system node is configured to take over more than one file system of an unresponsive node. The adaptive aspects of the present disclosure are not limited to any specific number of super blocks. The details for configuring and using the super blocks during a takeover and giveback operation are provided below with respect to FIGS. 6A-6D.

Furthermore, as an example, storage subsystem 112 also includes quarantined (or isolated/fenced off) storage locations 152A-152N. The quarantined storage locations are storage locations that an unresponsive storage system node that is being taken over may attempt to write during a takeover operation, as described below in detail. This ensures that the unresponsive storage system node does not overwrite any blocks within the active file system. It is noteworthy that there may be more than one quarantine/isolated storage location associated with each file system of an unresponsive storage system node.

Clustered Storage System: Before describing the various takeover/giveback aspects of the present disclosure in detail, the following describes a clustered based networked storage environment where the innovative technology for the takeover/giveback operations are executed. FIG. 2A shows a cluster-based, networked storage environment (may also be referred to as "storage environment") 200 with a plurality of storage system nodes (208.1-208.3) operating to store data on behalf of clients at storage devices 118.1-118.3. The various storage system nodes may be configured to operate as partner nodes, described above with respect to FIG. 1B, and are configured to takeover another node's storage using the super blocks of FIG. 1C.

Storage environment 200 may include a plurality of client systems 204.1-204.N (may also be referred to as "client system 204" or "client systems 204") as part of or associated with storage tenant 140, a clustered storage system 202 (similar to the storage system 108 of FIG. 1A/1B) and at least a network 206 communicably connecting the host system 102A-102N, client systems 204.1-204.N, the management console 132, the storage (or cloud) provider 124 and the clustered storage system 202. It is noteworthy that these components may interface with each other using more than one network having more than one network device.

The clustered storage system 202 includes the plurality of storage system nodes 208.1-208.3 (also referred to as "node 208" or "nodes 208"), a cluster switching fabric 210, and a plurality of mass storage devices 118.1-118.3 (similar to 118, FIG. 1A). The various nodes 208.1-208.3 can be configured as high-availability, pair nodes to operate as partner nodes, as shown in FIG. 1B. For example, node 208.1 and 208.2 may operate as partner nodes. If node 208.1 fails, node 208.2 takes over the storage volumes that are exposed by node 208.1 during a failover operation. Furthermore, node 208.3 may be configured to takeover node 208.1 or 208.2.

Each of the plurality of nodes 208.1-208.3 is configured to include a network module, a storage module, and a management module, each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the host systems 102A-102N, and the client systems 204.1-204.N (or the management console 132) over the computer network 206. The network modules 214.1-214.3 handle network file protocol processing (for example, CFS, NFS and/or iSCSI requests). The storage modules 216.1-216.3 connect to one or more of the storage devices and process I/O requests. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices, such as storage devices 118.1-118.3.

A switched virtualization layer including a plurality of virtual interfaces (VIFs) 219 is provided to interface between the respective network modules 214.1-214.3 and the client systems 204.1-204.N, allowing storage space at the storage devices associated with the nodes 208.1-208.3 to be presented to the client systems 204.1-204.N as a single shared storage pool.

The clustered storage system 202 can be organized into any suitable number of storage virtual machines (SVMs) (may be referred to as virtual servers (may also be referred to as "SVMs")), in which each SVM represents a single storage system namespace with separate network access. A SVM may be designated as a resource on system 200. Each SVM has a client domain and a security domain that are separate from the client and security domains of other SVMs. Moreover, each SVM is associated with one or more VIFs 219 and can span one or more physical nodes, each of which can hold one or more VIFs 219 and storage associated with one or more SVMs. Client systems can access the data on a SVM from any node of the clustered system, through the VIF(s) 219 associated with that SVM.

Each node 208.1-208.3 is a computing system to provide services to one or more of the client systems 204.1-204.N and host systems 102A-102N. The nodes 208.1-208.3 are interconnected by the switching fabric 210, which, for example, may be embodied as a Gigabit Ethernet switch or any other type of switching/connecting device.

Figure 2A:
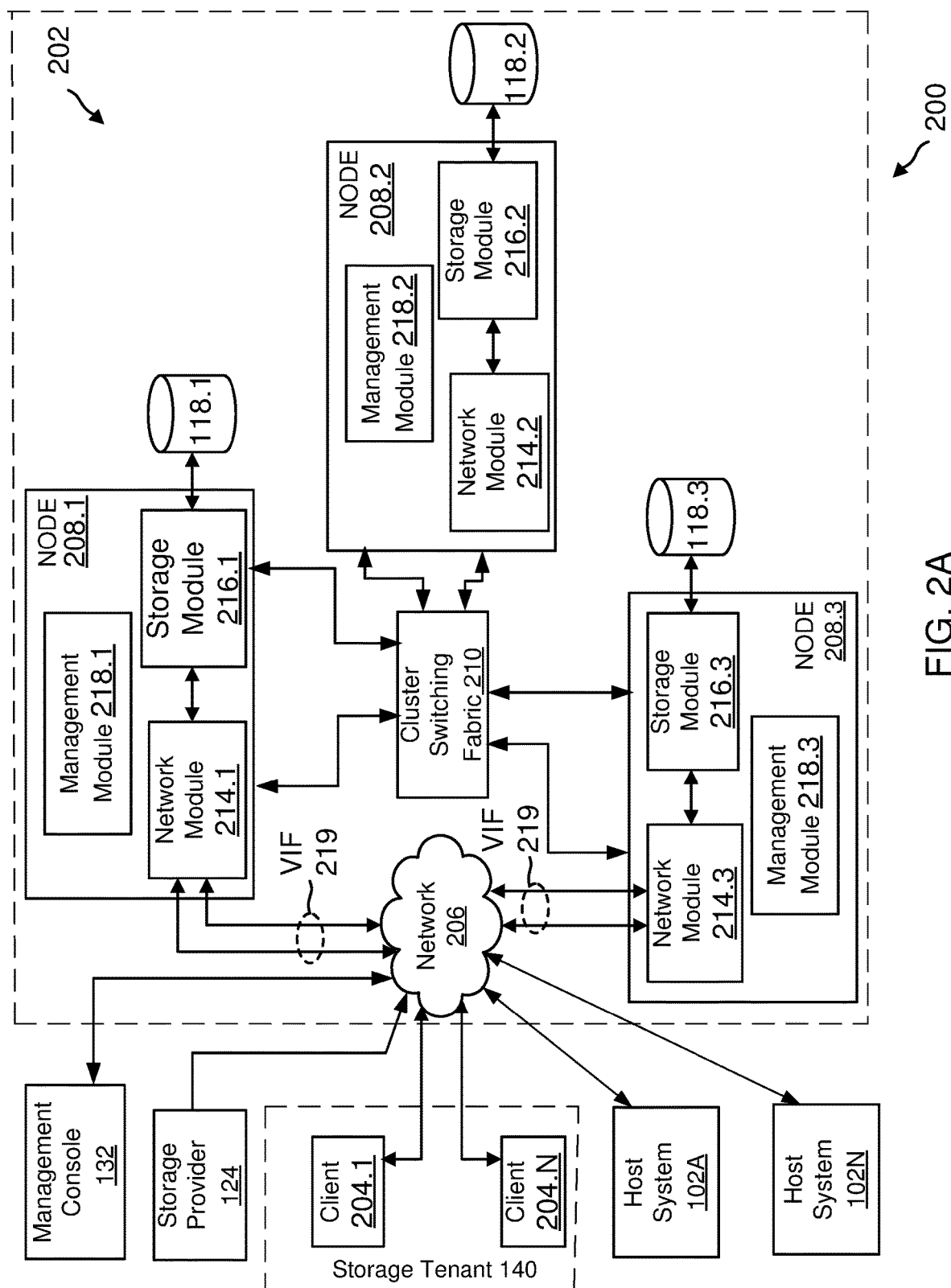
FIG. 2A shows an example of a clustered storage system with a plurality of storage system nodes that can be configured as partner nodes for failover operations, according to aspects of the present disclosure.

Although FIG. 2A depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules. In another aspect, the clustered storage system 202 may only include one network module and storage module.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Figure 2B:
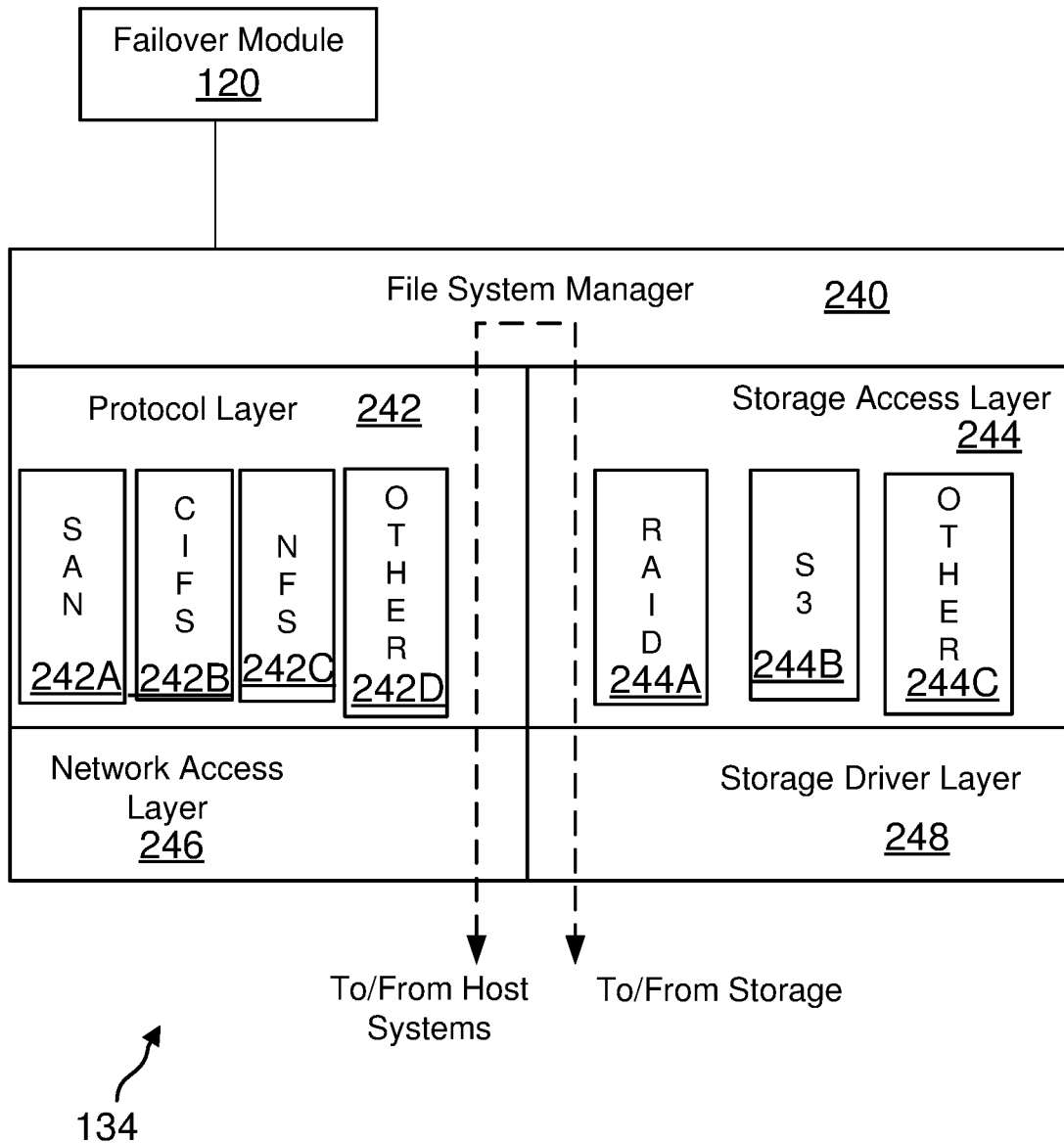
FIG. 2B shows an example of a storage operating system executed by a storage system node, according to aspects of the present disclosure.

Storage Operating System: FIG. 2B illustrates a generic example of the storage operating system 134 of FIG. 1A executed by the storage system node 108 (or nodes 208.1-208.3, FIG. 2A), according to one aspect of the present disclosure. In one example, storage operating system 134 may include several modules, or "layers" executed by one or both of network module 214 and storage module 216. These layers include a file system manager 240 that keeps track of a hierarchical structure of the data stored in storage devices 118 and manages read/write operation, i.e. executes read/write operation on storage in response to I/O requests, as described below in detail. The file system manager 240 interfaces with the failover module 120 during a takeover and giveback operation, described below in detail.

Storage operating system 134 may also include a protocol layer 242 and an associated network access layer 246, to allow node 208.1 to communicate over a network with other systems, such as clients 204.1/204. N. Protocol layer 242 may implement one or more of various higher-level network protocols, such as SAN (e.g. iSCSI) (242A), CIFS (242B), NFS (242C), Hypertext Transfer Protocol (HTTP) (not shown), TCP/IP (not shown) and others (242D). The network access layer 246 may include one or more drivers, which implement one or more lower-level protocols to communicate over the network, such as Ethernet. Interactions between host systems and mass storage devices are illustrated schematically as a path, which illustrates the flow of data through storage operating system 134.

The storage operating system 134 may also include a storage access layer 244 and an associated storage driver layer 248 to allow storage module 216 to communicate with a storage device. The storage access layer 244 may implement a higher-level storage protocol, such as RAID (244A), a S3 layer 244B to access a capacity tier for object-based storage (not shown), and other layers 244C. The storage driver layer 248 may implement a lower-level storage device access protocol, such as Fibre Channel or SCSI. The storage driver layer 248 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a storage system node, implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly attached to a client or host computer. The term "storage system" should therefore be taken broadly to include such arrangements in addition to any subsystems configured to perform a storage function and associated with other equipment or systems. It should be noted that while this description is written in terms of a write any-where file system, the teachings of the present disclosure may be utilized with any suitable file system, including a write in place file system.

Figure 3:
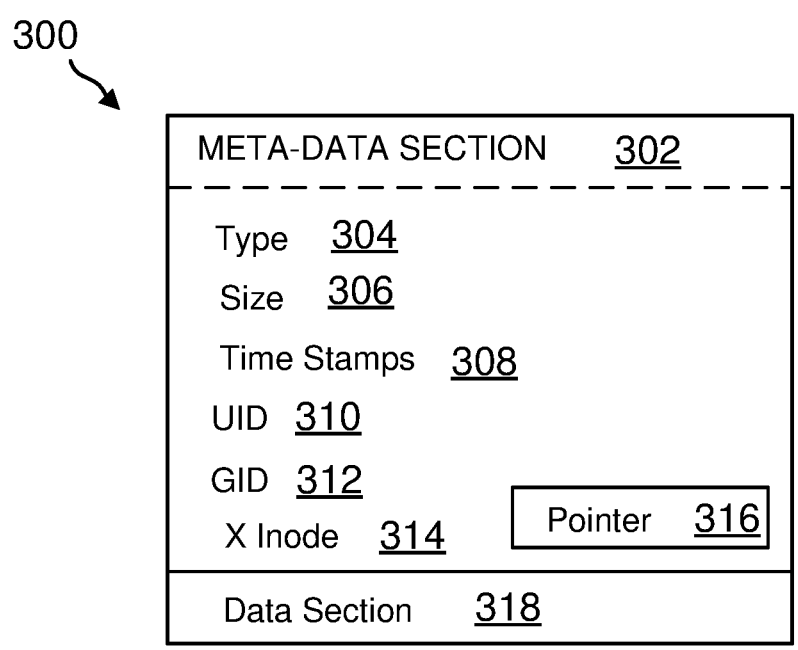
FIG. 3 shows an example of an "inode" used by a storage system node for storing and retrieving data from a storage device, according to aspects of the present disclosure.

Inode Structure: FIG. 3 shows an example of an inode structure 300 (may also be referred to as inode 300) used to store data on storage devices 118 of the storage subsystem 112, according to one aspect of the present disclosure. Inode 300 may include a meta-data section 302 and a data section 318. The information stored in the meta-data section 302 of each inode 300 describes a file and, as such, may include the file type (e.g., regular, directory or object) 304, size 306 of the file, time stamps (e.g., access and/or modification time) 308 for the file and ownership, i.e., user identifier (UID 310) and group ID (GID 312), of the file. The metadata section 302 may also include an X-inode field 314 with a pointer 316 that references another on-disk inode structure containing, e.g., access control list (ACL) information associated with the file or directory.

The contents of data section 318 of each inode 300 may be interpreted differently depending upon the type of file (inode) defined within the type field 304. For example, the data section 318 of a directory inode structure includes meta-data controlled by the file system, whereas the data section of a "regular inode" structure includes user-defined data. In the latter case, the data section 318 includes a representation of the data associated with the file. Data section 318 of a regular on-disk inode file may include user data or pointers, the latter referencing, for example, data blocks for storing user data at a storage device.

Inode structure 300 may have a restricted size (for example, 122 bytes). Therefore, user data having a size that is less than or equal to 64 bytes may be represented, in its entirety, within the data section of an inode. However, if the user data is greater than 64 bytes but less than or equal to, for example, 64 kilobytes (KB), then the data section of the inode comprises multiple pointers, e.g. 16 pointers, each of which references a block of data stored at a disk. Moreover, if the size of the data is greater than 64 kilobytes but less than or equal to 64 megabytes (MB), then each pointer in the data section 318 of the inode references an indirect inode that contains multiple pointers (e.g. 1024 pointers), each of which references a data block on disk.

Figure 4:
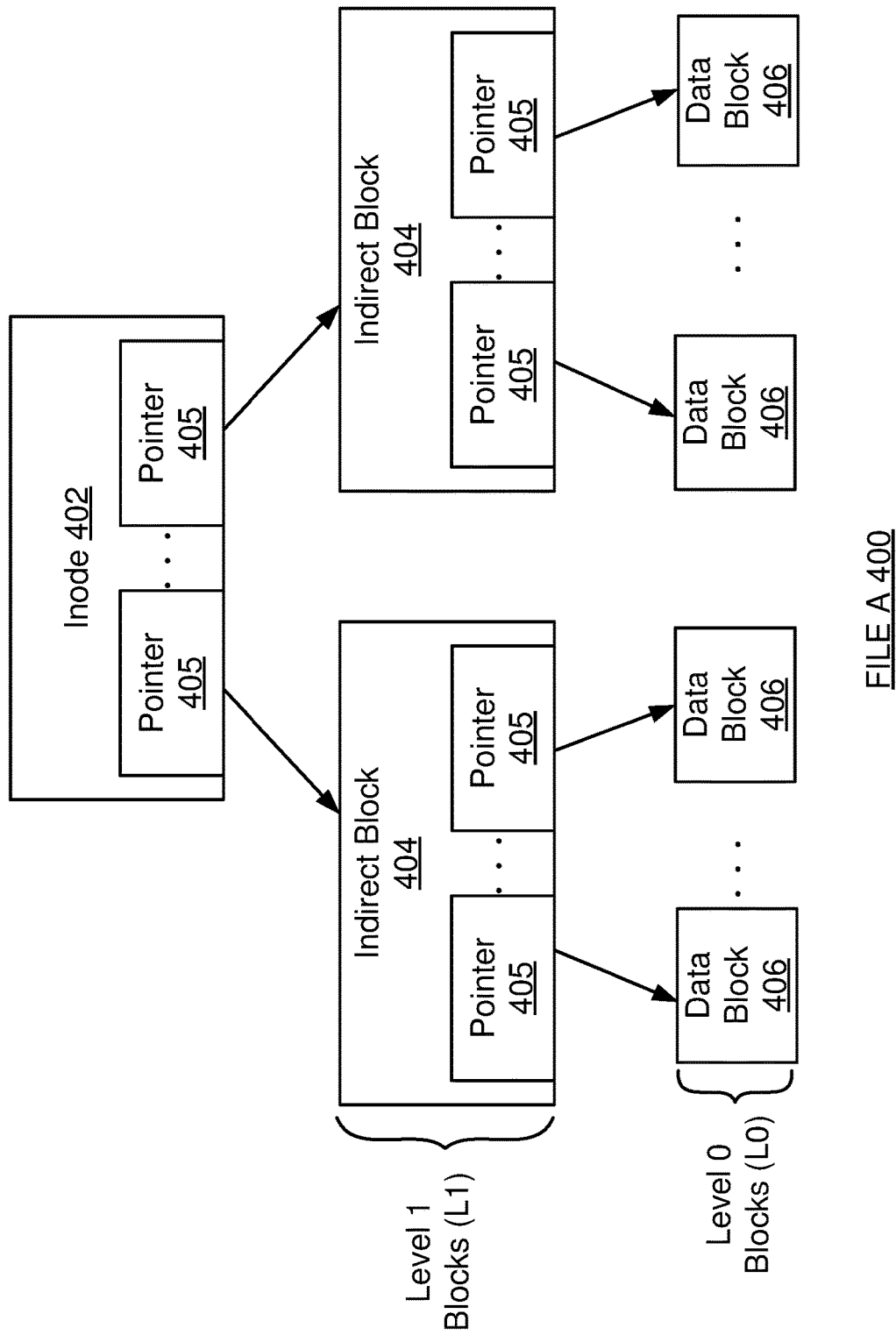
FIG. 4 shows an example of a buffer tree used by a storage operating system of a storage system node, according to aspects of the present disclosure.

Buffer Tree: FIG. 4 is an example of an inode buffer tree of a data container that may be used by the storage operating system 134. The buffer tree is an internal representation of blocks for a data container (e.g., file A 400) loaded into the buffer cache 140 (e.g., of a storage system node 108 as illustrated in FIG. 1B) and maintained by the file system manager 240. A root (top-level) Mode 402 such as an embedded inode, references indirect blocks 404 (e.g., Level 1). The root inode 402 may be referenced by a fsinfo block that in turn maybe referenced by a super block.

The indirect blocks (and mode) contain pointers 405 that ultimately reference data blocks 406 used to store the actual data of file A. That is, the data of file A 400 are contained n data blocks and the locations of these blocks are stored in the indirect blocks of the file. Each Level 1 indirect block 404 may contain pointers to a plurality of data blocks.

In one aspect, the file system manager 240 allocates blocks, and frees blocks, to and from a virtual volume (may be referred to as VVOL) of an aggregate. The aggregate, as mentioned above, is a physical volume comprising one or more groups of storage devices, such as RAID groups, underlying one or more VVOLs of the storage system. The aggregate has its own physical volume block number (PVBN) space and maintains metadata, such as block allocation bitmap structures, within that PVBN space. Each VVOL also has its own virtual volume block number (VVBN) space and maintains metadata, such as block allocation bitmap structures, within that VVBN space. Typically, PVBNs are used as block pointers within buffer trees of files (such as file 400) stored in a VVOL.

As an example, a VVOL may be embodied as a container file in an aggregate having L0 (data) blocks that comprise all blocks used to hold data in a VVOL; that is, the L0 data blocks of the container file contain all blocks used by a VVOL. L1 (and higher) indirect blocks of the container file reside in the aggregate and, as such, are considered aggregate blocks. The container file is an internal (to the aggregate) feature that supports a VVOL; illustratively, there is one container file per VVOL. The container file is a hidden file (not accessible to a user) in the aggregate that holds every block in use by the VVOL.

When operating in a VVOL, VVBN identifies a FBN location within the file and the file system uses the indirect blocks of the hidden container file to translate the FBN into a PVBN location within the physical volume, which block can then be retrieved from storage 118.

Figure 5:
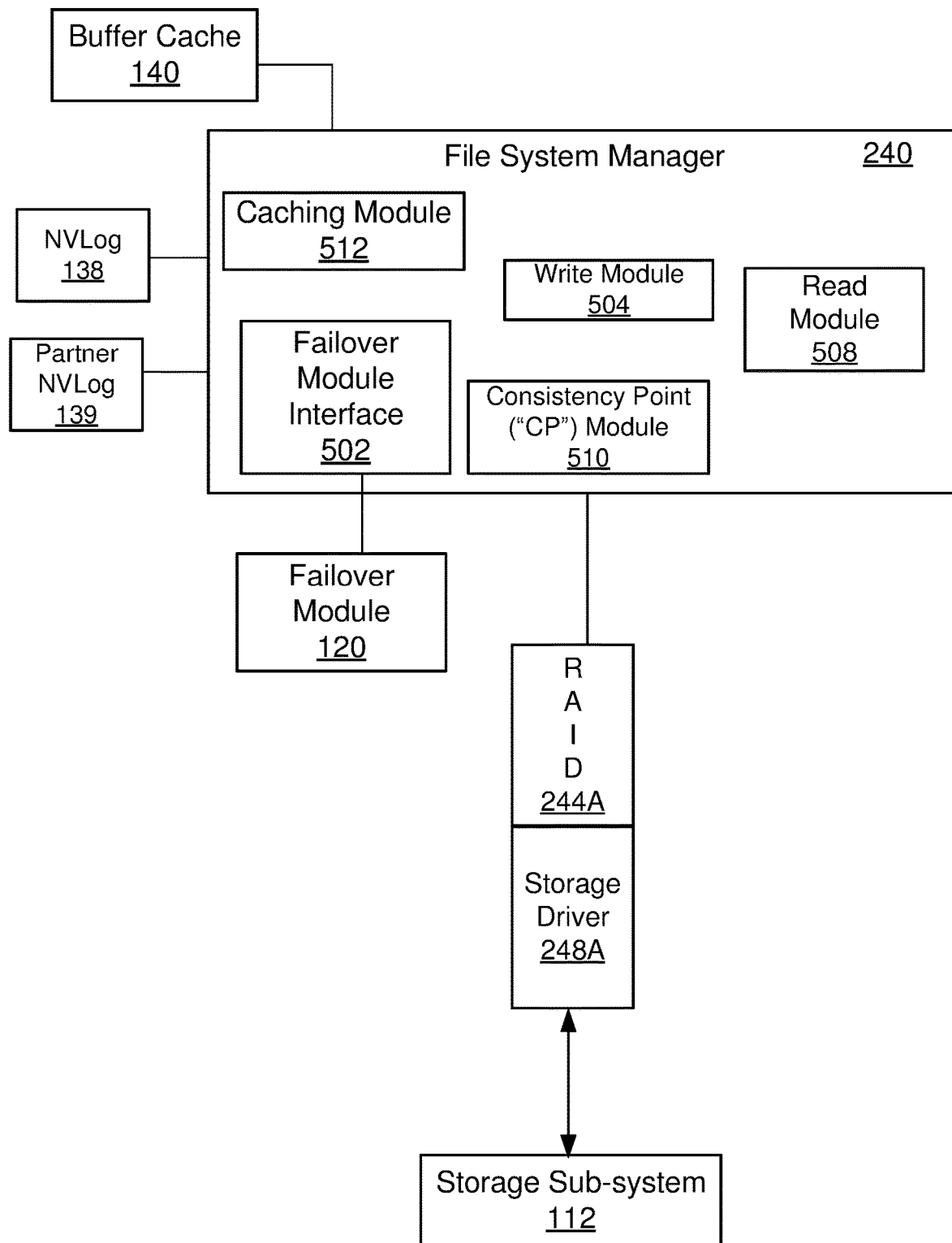
FIG. 5 shows a block diagram illustrating an example of various components of a file system manager of a storage operating system, according to aspects of the present disclosure.

File System Manager 240: FIG. 5 shows a block diagram of the file system manager 240 (first introduced with respect to FIG. 2B), according to one aspect of the present disclosure. The file system manager 240 includes a write module 504 that manages write requests for writing data in storage device 118 (FIG. 1A) and a read module 508 that manages read requests for reading data from storage devices 118.

The write module 504 may include a write allocator sub-module (not shown) that allocates storage space for storing data. The write allocator maintains a list of free blocks that may be used by a node for writing data. The write allocator may predict what storage blocks may get written at any given time, based on a pattern of write requests. For example, for requests from a certain source to write large amount of data, the write allocator will predict larger storage space and blocks for storing data. For requests to write smaller files, the write allocator predicts smaller storage space. Since the write module 504 is aware of the write requests at any given time, it can predict where data maybe written soon.

The buffer cache 140 is managed by a caching module 512. A consistency point (CP) module 510 is used to manage CP operations to flush data from the buffer cache 140 to persistent storage (e.g. storage devices 118). In one aspect, when data is to be persistently stored, the data is marked as dirty at the buffer cache 140, and then the CP module 510 flushes the dirty data from the buffer cache 140 to the storage subsystem 112 e.g. at storage devices 118.

The read module 508 is used to fetch data from the storage devices 118 at the storage subsystem 112 in response to read requests. The RAID layer 244A using a storage driver 248A, for example a Fibre Channel driver, is used to access the storage devices 118 at the storage subsystem 112 to retrieve the requested data and present the data to an application that requested the data.

In one aspect, the file system manager 240 interfaces with the failover module 120 via a failover module interface (e.g. an API) 502 during a takeover and a giveback operation. The failover module 120 manages the takeover and the giveback operation, as described below in detail.

Figure 6A:
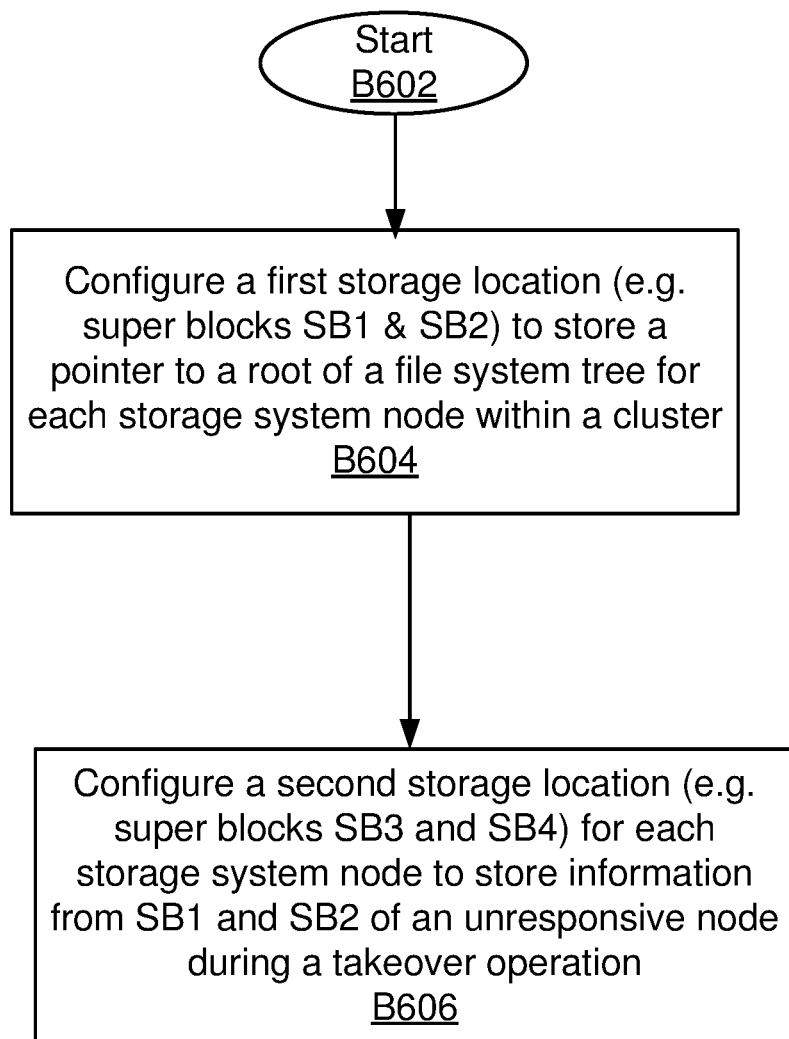
FIG. 6A shows an example of various operations of a process for configuring storage space for managing failover operations, according to aspects of the present disclosure.

Process Flows: FIG. 6A shows a process flow 600 for allocating storage locations for a plurality of storage system nodes of a networked storage system. Process 600 begins in block B602, when the plurality of storage system nodes of the networked storage system is deployed or at any time while the nodes are operational.

In block B604, a first storage location is assigned for each storage system node. The first storage location may include a first block (e.g. SB1 150A, FIG. 1C) and a second block (e.g. SB2 150A) for a first storage system node (e.g. 108A). Similarly, SB1 150E and SB2 150F are assigned to the second storage system node 108B, and SB1 150I and SB2 150I are assigned to the storage system node 108N, for a cluster having more than two nodes. The SB1 and SB2 blocks of each storage system node are used during normal file system operation as a fsinfo block (or point to an fsinfo block) of an active file system to record write operations to the active file system. In one aspect, during normal operations, when data is written, the write module 240 of each storage system node adds a sequence number in SB1 and SB2. The sequence number is incremented upon each write operation and indicates the latest version of the active file system.

To manage a takeover operation, in block B606, a second storage location is assigned for each storage system node. For example, SB3 150C and SB4 150D are assigned to the first storage system node. SB3 150C and SB4 150D are used when the first storage system node 108A takes over another node, e.g. 108B or 108N (see FIG. 1C). Similarly, SB3 150G and SB4 150H are assigned to the second storage system node 108B. SB3 150G and SB4 150H are used when the second storage system node 108B takes over another node, e.g. 108A or 108N (see FIG. 1C). Furthermore, SB3 150K and SB4 150L are assigned to the storage system node 108N. SB3 150K and SB4 150L are used when the storage system node 108N takes over another storage system node, e.g. 108A or 108B.

As described above, the number of SB3 and SB4 blocks vary based on the number of nodes within a cluster that are configured to takeover another node during a takeover operation, as well as the number of file systems that are supported by each node.

Figure 6B:
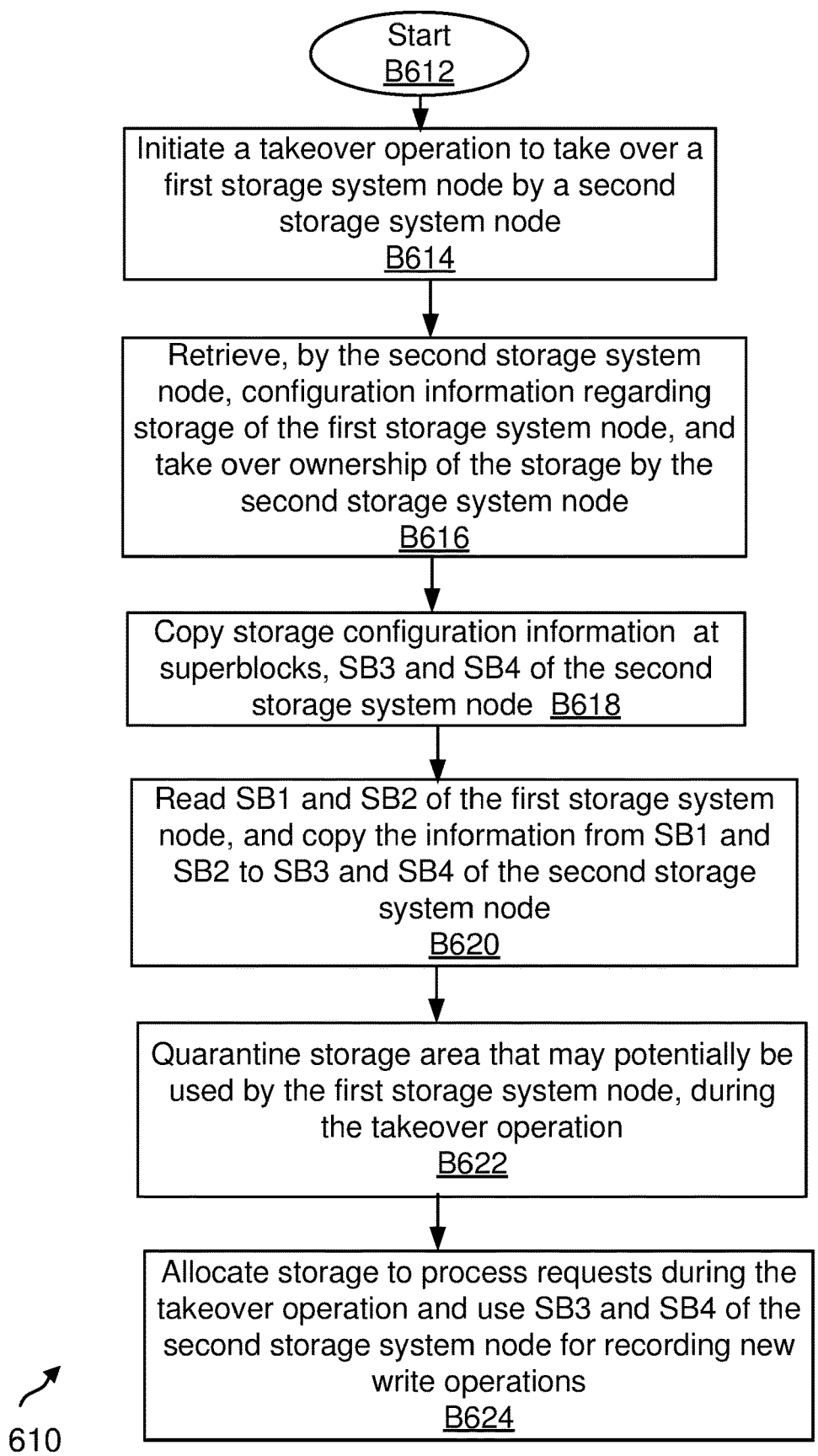
FIG. 6B shows an example of various operations a process for a takeover operation, according to aspects of the present disclosure.

FIG. 6B shows a process 610 for executing a takeover operation, according to one aspect of the present disclosure. Process 610 is executed by a storage system node of a networked storage system having a plurality of storage system nodes. It is noteworthy that although the description below describes how a second storage system node (e.g. 108B) takes over a first storage system node (e.g. 108A), the adaptive aspects of the present disclosure are not limited to just two nodes. The technology described herein may be implemented in a cluster having more than two nodes, such that any node, if configured for takeover, can take over a failing/unresponsive node.

Process 610 begins in block B612, after the second storage system node 108B detects that the first storage system node 108A is unresponsive. In one aspect, the second storage system node 108B regularly transmits "heartbeat"

messages to the first storage system node 108A, expecting a response to the heartbeat messages. When a response is not received within a threshold duration, the second storage system 108B assumes that the first storage system node 108A maybe failing and hence, may need to be taken over. The use of heartbeat messages is not the only way to determine if a storage system node is being unresponsive, there may be other techniques to make that determination. For example, a failing node may transmit a message indicating that one or more components may be failing; the management console 132 may detect a potential storage system failure, based on monitoring data received from a failing storage system node or any other technique. The adaptive aspects of the present disclosure are not limited to any specific technique for detecting non-responsiveness of a storage system node. Furthermore, the takeover operation can be triggered by a user request, without detecting any potential or actual failing node.

In block B614, the second storage system node 108B initiates the takeover operation, as part of a failover operation, to take over the storage that was managed by the first storage system node 108A. The takeover operation is initiated by the failover module 120B that notifies the storage operating system 134B to take over the storage that was assigned to the first storage system node 108A for processing any read and write requests associated with the assigned storage. The takeover operation maybe initiated after a logical interface (LIF) associated with the first storage system node 108A is migrated to the second storage system node 108B. This ensures that the second storage system node 108B receives read and write requests that are addressed to the first storage system node 108A.

In block B616, the second storage system node 102B retrieves information regarding the storage used by the first storage system node 108A. This information may include striping, mirroring, and parity information for a RAID configuration. This information may also include aggregate details including volume/LUN identifiers, disk partition information or any storage space related data. This information may be stored at a dedicated storage location for the first storage system 108A. Once the storage related information is retrieved, the ownership of the first storage system node storage is transferred to the second storage system node 108B.

In block B618, the retrieved storage configuration information is stored by the second storage system node 108B at storage blocks, SB3 150G and SB4 150H, as shown in FIG. 1C.

In block B620, the second storage system node 108B reads storage blocks SB1 150A/SB2 150B assigned to the first storage system node 108A. The information from SB1 150A/SB2 150B is copied to SB3 150G and SB4 150H of the second storage system node 108B, respectively. In one aspect, the second storage system node 108B reads the latest sequence number from the SB1 150A/SB2 150B. The second storage system node 108B increases the sequence number by "N" at SB1 150A and SB2 150B such that the first storage system node 108A does not perform a CP operation during the takeover. This allows the second storage system node 108B to execute the takeover operation reliably, based on the latest sequence number read from SB1 150A/SB2 150B.

In block B622, the second storage system node 108B quarantine's (or isolates or fences off) the storage space that the first storage system node 108A may use during the takeover operation. In one aspect, the write module 504 of the first storage system node 108A predicts the blocks that may written. The prediction may be based on a write pattern tracked by the write module 504. This information may be stored in a list at a storage location. The second storage system 108B retrieves the list and quarantine's the storage space that is likely to be written, in case the first storage system node 108A may be partially operational, while being unresponsive.

The quarantined space, shown as 152A-152N in FIG. 1C, ensures that if the first storage system node 108A performs any write operations during the takeover operation, those entries are not included in the takeover by the second storage system node 108B. This ensures that the active file system of the first storage system node 108A built by the second storage system node 108B, during the takeover operation, is built accurately from the information copied from SB1 150A and SB2 150B.

In block B624, the second storage system node 108B allocates storage space to store data for any storage requests that maybe received during the takeover operation and while it owns the storage of the first storage system node 108A. SB3 150G and SB4 150H are used for tracking any write operations, while the second storage system node 108B own the storage of the first storage system node 108A. The takeover operation is completed after the second storage system node 108B is configured to process any write requests that are addressed to the first storage system node 108A.

In one aspect, if the first storage system node 108A reboots during the takeover operation, it does not use SB1 150A/SB2 150B until the takeover operation is complete. This is based on a configuration setting established by the second storage system node 108B to indicate to the first storage system node 108A that it is being taken over.

Figure 6C:
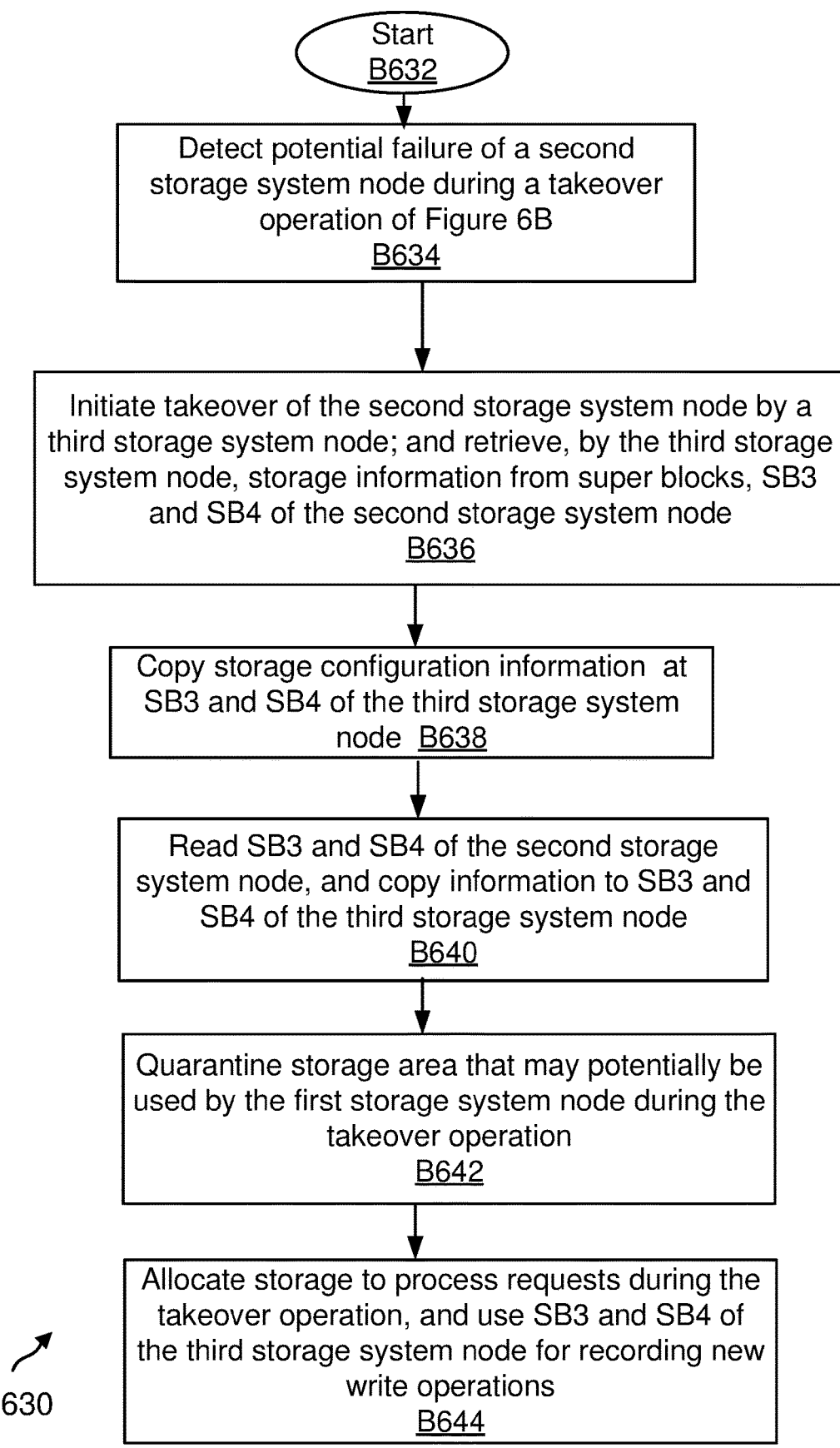
FIG. 6C shows an example of various operations a process for handling a failure during a takeover operation, according to aspects of the present disclosure.

FIG. 6C shows a process 630 for handling a failure of the second storage system node 108B (i.e. a cascading failure), while it attempts to take over the first storage system node 108A, as described above with respect to FIG. 6B. The process 630 begins in block B632, after a takeover operation has been initiated by the second storage system node 108B and process blocks B614-B620 of FIG. 6A have been executed.

In block B634, a potential failure of the second storage system node 108B is detected. In one aspect, another storage system node (e.g. 108N) sends a "heartbeat" message to the second storage system node 108B, and if an expected response is not received within a certain duration, then the storage system node 108N initiates a takeover of the second storage system node 108B in block B636. The storage system node 108N also retrieves the storage information from SB3 150G and SB4 150H of the second storage system node 108B. The retrieved information is copied to the storage blocks SB3 150K and SB4 150L (see FIG. 1C) of the storage system node 108N in block B638. It is noteworthy that although this example mentions the storage system node 108N taking over the storage system node 108B, the storage system node 108N may also be configured to take over one or more file systems of other storage system nodes.

In block B640, the third storage system node 108N reads SB3 150G and SB4 150H of the second storage system node 108B and copies that information to SB3 150K and SB4 150L of storage system node 108N.

Blocks B642 and B644 are like blocks B622 and B624, respectively, described above with respect to FIG. 6B to complete the takeover operation.

Figure 6D:
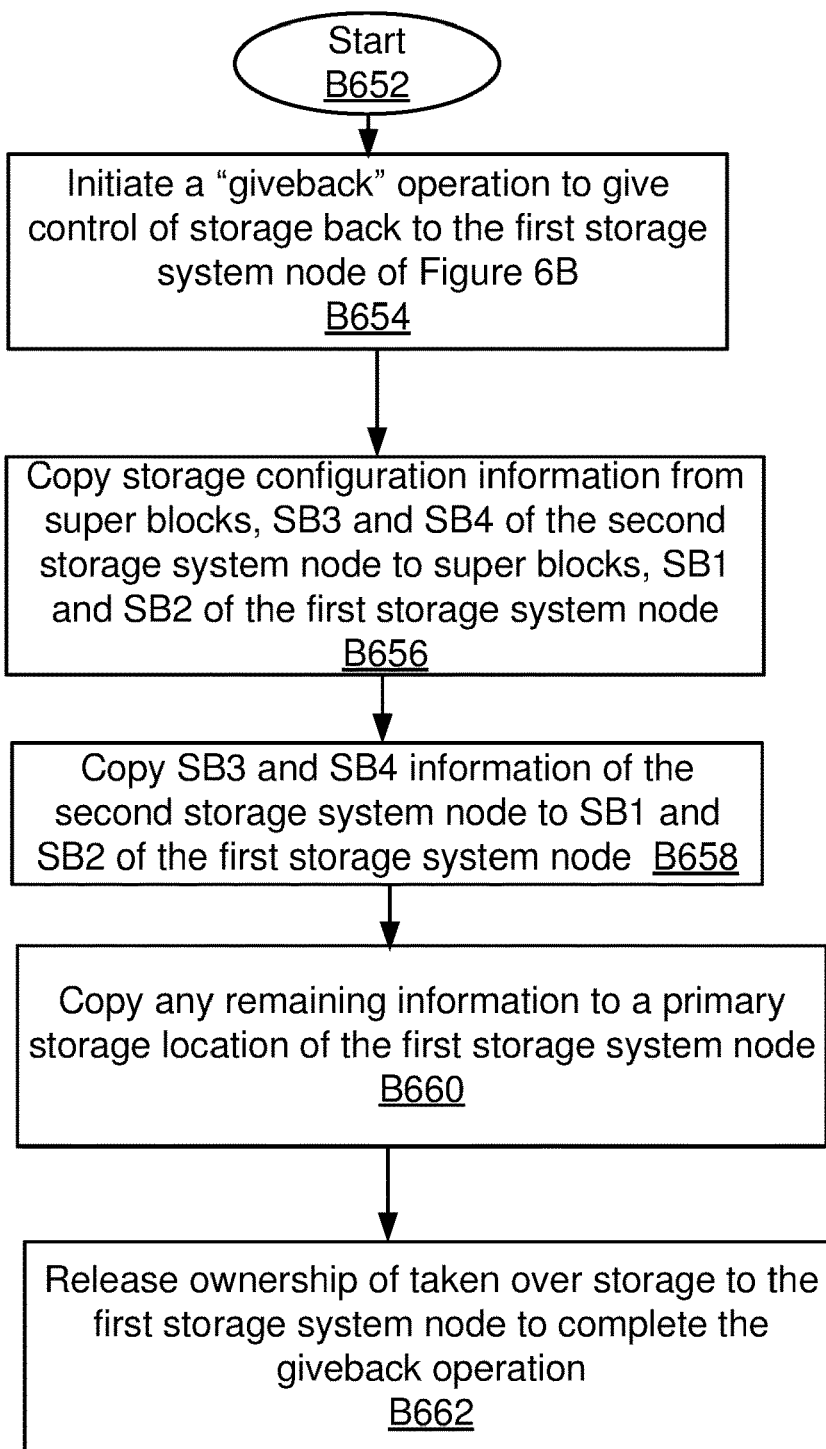
FIG. 6D shows an example of various operations a process for handling a giveback operation, according to aspects of the present disclosure.

FIG. 6D shows a process 650 for executing a giveback operation to give back control to the first system node 108A by the second storage system node 108B, after the first storage system node 108A becomes responsive. As described above with respect to FIG. 6B, the availability of the first storage system node 108A is detected by the second storage system node 108B by sending a heartbeat message, and if an expected response is received within an expected duration, the second storage system 108B assumes that the storage system node 108A is responsive.

In block B654, the giveback operation is initiated by the second storage system node 108B. Storage configuration information is copied from SB3 150G and SB4 150H of second storage system node 108B to SB1 150A and SB2 150B of the first storage system node 150A. The storage configuration information is the updated configuration information for storage used by the second storage system node 108B for the takeover operation.

In block B658, the pointers and file system information from SB3 150G and SB4 150H of the second storage system node 108B is copied to SB1 150A and SB2 150B of the first storage system node 108A.

In block B660, any remaining information that was stored by the second storage system node 108B, while the first storage system node 108A was down, is copied back to the primary storage location assigned to and managed by the first storage system node 108A. Thereafter, in block B662, the ownership of the storage is transferred back to the first storage system node 108A from the second storage system node 108B, and the giveback operation concludes. After, the giveback operation, the first storage system node 108A is able to process read and write requests, and accordingly, updates SB1 150A/SB 150B.

In one aspect, an innovative, computer executable method is provided. The method includes, copying (B616-B620, FIG. 6B), by a second storage system node (108A, FIG. 1B), information from a first storage location (SB1 150A/SB2 150B, FIG. 1C) to a second storage location (SB3 150G/SB4 150H), the first storage location pointing to an active file system of a first storage system node, the second storage location assigned to the second storage system node for a takeover operation to take over storage of a first storage system node by the second storage system node. The method further includes quarantining (B622, FIG. 6B), by the second storage system node, storage space likely to be used by the first storage system node for a write operation, while the second storage system node attempts to take over the storage of the first storage system node; and utilizing (B656-B662, FIG. 6D), by the second storage system node, information stored at the second storage location during the takeover operation to give back control of the storage to the first storage system node by copying the information stored at the second storage location to the first storage location.

In another aspect, a non-transitory, machine readable storage medium having stored thereon instructions comprising machine executable code. The machine executable code, when executed by a machine, causes the machine to: allocate a first storage location (e.g. 150A/150B, FIG. 1C) to a first storage system node (e.g. 108A, FIG. 1B) to point to an active file system of the first storage system node; allocate a second storage location (e.g. 150C and 150D, FIG. 1C) to the first storage system node to take over storage of a second storage system node (e.g. 108B, FIG. 1B), upon detecting the second storage system node is unresponsive; assign a third storage location (e.g. 150E and 150F, FIG. 1C) to the second storage system node to point to an active file system of the second storage system node; assign a fourth storage location (e.g. 150G and 150H, FIG. 1C) to the second storage system node to take over storage of the first storage system node, upon detecting the first storage system node is unresponsive; and copy (B636/B638, FIG. 6B), by the second storage system node, information stored at the first storage location to the fourth storage location, during a takeover operation to take over storage of the first storage system node.

In one aspect, the innovative takeover and giveback technology, enables a storage system node to takeover storage of a failed or failing node, without having to make a storage reservation (e.g. a SCSI-3 reservation). Because no reservation is made, the takeover process is efficient and flexible, enabling other nodes to use the storage space that is taken over.

Figure 7:
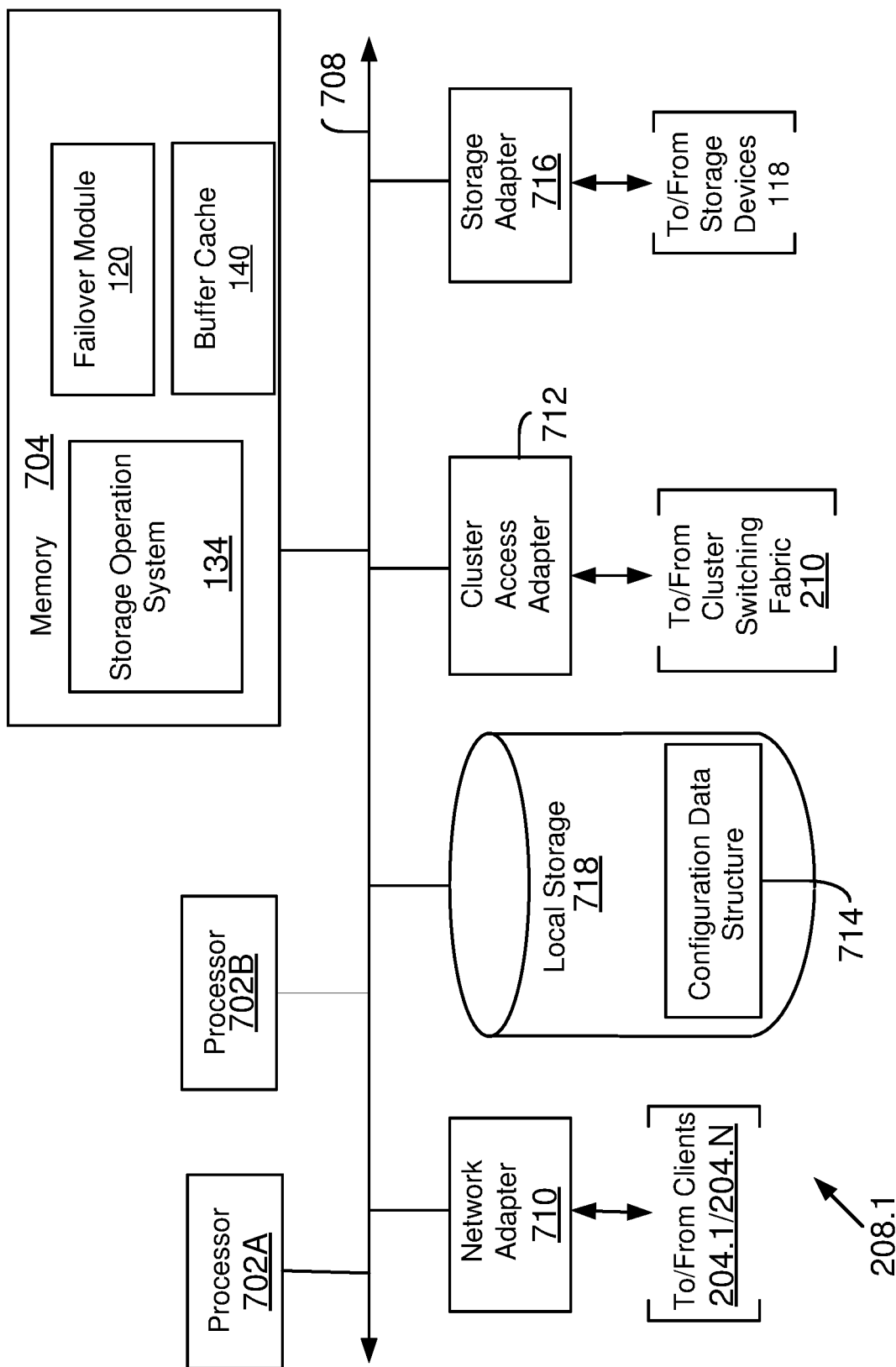
FIG. 7 shows an example of a storage system node, according to aspects of the present disclosure.

Storage System Node: FIG. 7 is a block diagram of a node 208.1, (including the storage system nodes 108A/108B) that is illustratively embodied as a storage system comprising of a plurality of processors 702A and 702B, a memory 704, a network adapter 710, a cluster access adapter 712, a storage adapter 716 and local storage 718 interconnected by a system bus 708. In one aspect, when node 208.1 becomes unresponsive, another node, e.g. 208.2 takes over the storage that was managed by the node, as described above with respect to FIGS. 6A-6D. The node 208.1 may become unresponsive due to an error associated with one its components, due to a network connection or for any other reason.

As an example, processors 702A-702B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The local storage 718 comprises one or more storage devices utilized by the node to locally store configuration information for example, in a configuration data structure 714. The configuration information may include striping, mirroring, and parity information for a RAID configuration. The configuration information may also include aggregate details including volume/LUN identifiers, disk partition information or any storage space related data. This information during a takeover operation is retrieved by a storage system node taking over node 208.1.

The cluster access adapter 712 comprises a plurality of ports adapted to couple node 208.1 to other nodes of cluster 202 (FIG. 2A). In one aspect, an error associated with the cluster access adapter 712 may result in the node 208.1 becoming unresponsive. In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and storage modules are implemented on separate storage systems or computers, the cluster access adapter 712 is utilized by the network/storage module for communicating with other network/storage-modules in the cluster 202.

Each node 208.1 is illustratively embodied as a dual processor storage system executing the failover module 120 for managing a failover operation, and the storage operating system 134 that preferably implements a high-level module, such as a file system 240, to logically organize the information as a hierarchical structure of named directories and files at storage 118. However, it will be apparent to those of ordinary skill in the art that the node 208.1 may alternatively comprise a single or more than two processor systems. Illustratively, one processor 702A executes the functions of the network module on the node, while the other processor 702B executes the functions of the storage module.

The memory 704 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 134 portions of which is typically resident in memory and executed by the processing elements, functionally organizes the node 208.1 by, inter alia, invoking storage operation in support of the storage service implemented by the node.

In one aspect, data that needs to be written is first stored at a buffer cache 140 in memory 704. The written data is moved to NVRAM storage, stored at a partner NVRAM (FIG. 1B) and then stored persistently at storage devices 118 during a CP operation.

The network adapter 710 comprises a plurality of ports adapted to couple the node 208.1 to one or more clients 204.1/204.N over point-to-point links, wide area networks, virtual private networks implemented over a public network (Internet) or a shared local area network. The network adapter 710 thus may comprise the mechanical, electrical and signaling circuitry needed to connect the node to the network. Each client 204.1/204.N may communicate with the node over network 206 (FIG. 2A) by exchanging discrete frames or packets of data according to pre-defined protocols, such as TCP/IP.

The storage adapter 716 cooperates with the storage operating system 134 executing on the node 208.1 to access information requested by the clients. The information may be stored on any type of attached array of writable storage device media such as hard drives, solid state drivers, storage class memory, video tape, optical, DVD, magnetic tape, bubble memory, electronic random access memory, micro-electro mechanical and any other storage media adapted to store information, including data and parity information. However, as illustratively described herein, the information is preferably stored at storage device 118. The storage adapter 716 comprises a plurality of ports having input/output (I/O) interface circuitry that couples to the storage devices over an I/O interconnect arrangement, such as a conventional high-performance, Fibre Channel link topology. In one aspect, if an error prevents the storage adapter 716 to access storage device 118, then the node 208.1 may become unresponsive and trigger a takeover operation, described above with respect to FIGS. 6B-6D.

Figure 8:
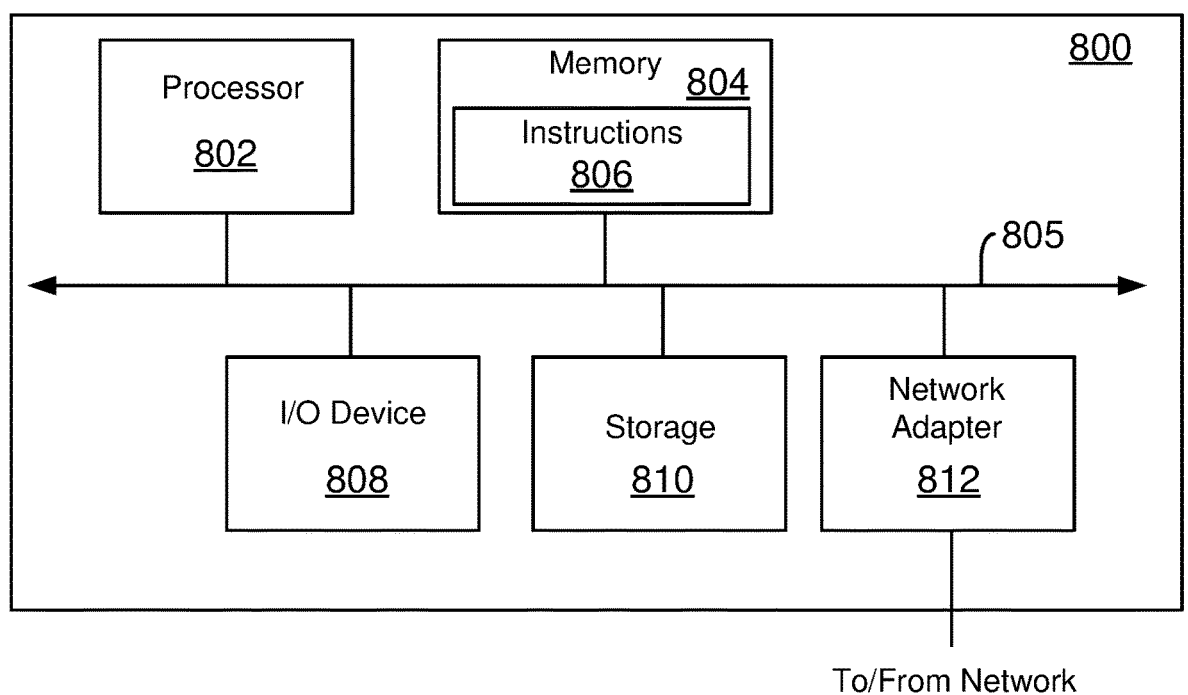
FIG. 8 shows an example of a processing system, used according to aspects of the present disclosure.

Processing System: FIG. 8 is a high-level block diagram showing an example of the architecture of a processing system 800 that may be used according to one aspect. The processing system 800 can represent the storage system node 108, host system 102, management console 132, or clients 116, 204. Note that certain standard and well-known components which are not germane to the present aspects are not shown in FIG. 8.

The processing system 800 includes one or more processor(s) 802 and memory 804, coupled to a bus system 805. The bus system 805 shown in FIG. 8 is an abstraction that represents any one or more separate physical buses and/or point-to-point connections, connected by appropriate bridges, adapters and/or controllers. The bus system 805, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 802 are the central processing units (CPUs) of the processing system 800 and, thus, control its overall operation. In certain aspects, the processors 802 accomplish this by executing software stored in memory 804. The processors 802 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 804 represents any form of random-access memory (RAM), read-only memory (ROM), flash memory, or the like, or a combination of such devices. Memory 804 includes the main memory of the processing system 800. Instructions 806 may be used to implement the process steps of FIGS. 6A-6D described above, may reside in and executed (by processors 802) from memory 804.

Also connected to the processors 802 through the bus system 805 are one or more internal mass storage devices 810, and a network adapter 812. Internal mass storage devices 810 may be or may include any conventional medium for storing large volumes of data in a non-volatile manner, such as one or more magnetic or optical based disks, solid state drives, or any other storage media. The network adapter 812 provides the processing system 800 with the ability to communicate with remote devices (e.g., storage servers) over a network and may be, for example, an Ethernet adapter, a Fibre Channel adapter, or the like.

The processing system 800 also includes one or more input/output (I/O) devices 808 coupled to the bus system 805. The I/O devices 808 may include, for example, a display device, a keyboard, a mouse, etc.

Cloud Computing: The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services, for example, the storage system 108 is accessible as a cloud service. Details regarding these layers are not germane to the embodiments disclosed herein.

Thus, methods and systems for efficiently managing a failover operation in a networked storage environment have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed by one or more processors, comprising:
   reserving storage space in a second storage system node, wherein the storage space is for use by a first storage system node for any write operations that occur while the second storage system node attempts to take over storage of the first storage system node, wherein the first storage system node and the second storage system node are configured to operate as failover partner nodes;
   in response to detecting the first storage system node is healthy, copying, by the second storage system node, information from a second storage location assigned to the second storage system node to a first storage location assigned to the first storage system node; and
   releasing, by the second storage system node, ownership of the storage space to the first storage system.

2. The method of claim 1, further comprising:
   in response to detecting the first storage system node is unresponsive, copying by the second storage system node configuration information regarding the storage of the first system node from the first storage location to the second storage location.

3. The method of claim 1, further comprising:
   prior to the second storage system node attempting to take over storage of the first storage system node, assigning the first storage location to the first storage system node to point to an active file system of the first storage system node.

4. The method of claim 3, further comprising:
   accessing the active file system of the first storage system node using information copied from the first storage location to the second storage location.

5. The method of claim 1, further comprising:
   upon detecting a failure in the second storage system node while taking over the storage of the first storage system node, using a third storage system node for taking over storage of the second storage system node to complete taking over storage of the first storage system node.

6. The method of claim 1, further comprising:
   allocating a third storage location for the second storage system node to track write requests for storage managed by the second storage system node.

7. The method of claim 1, further comprising:
   allocating, by the second storage system node, storage space for storing data for a write request that would have been written by the first storage system node.

8. A non-transitory, machine readable storage medium having stored thereon instructions comprising machine executable code, which when executed by a machine, causes the machine to:
   reserve storage space in a second storage system node, wherein the storage space is for use by a first storage system node for any write operations that occur while the second storage system node attempts to take over storage of the first storage system node, wherein the first storage system node and the second storage system node are configured to operate as failover partner nodes;
   in response to detecting the first storage system node is healthy, copy, by the second storage system node, information from a second storage location assigned to the second storage system node to a first storage location assigned to the first storage system node; and
   release, by the second storage system node, ownership of the storage space to the first storage system.

9. The non-transitory, machine readable storage medium of claim 8, wherein the machine executable code further causes the machine to:
   in response to detecting the first storage system node is unresponsive, copy by the second storage system node configuration information regarding the storage of the first system node from the first storage location to the second storage location.

10. The non-transitory, machine readable storage medium of claim 8, wherein the machine executable code further causes the machine to:
    prior to the second storage system node attempting to take over storage of the first storage system node, assign the first storage location to the first storage system node to point to an active file system of the first storage system node.

11. The non-transitory, machine readable storage medium of claim 10, wherein the machine executable code further causes the machine to:
    access the active file system of the first storage system node using information copied from the first storage location to the second storage location.

12. The non-transitory, machine readable storage medium of claim 8, wherein the machine executable code further causes the machine to:
    upon detecting a failure in the second storage system node while taking over the storage of the first storage system node, use a third storage system node for taking over storage of the second storage system node to complete taking over storage of the first storage system node.

13. The non-transitory, machine readable storage medium of claim 8, wherein the machine executable code further causes the machine to:
    allocate a third storage location for the second storage system node to track write requests for storage managed by the second storage system node.

14. A system, comprising:
    a first storage system node;
    a second storage system node, wherein the first storage system node and the second storage system node are configured to operate as failover partner nodes;
    a memory containing machine readable medium comprising machine executable code having stored thereon instructions; and a processor coupled to the memory to execute the machine executable code to cause the second storage system node to:
  reserve storage space in the second storage system node, wherein the storage space is for use by the first storage system node for any write operations that occur while the second storage system node attempts to take over storage of the first storage system node;
  in response to detecting the first storage system node is healthy, copy, by the second storage system node, information from a second storage location assigned to the second storage system node to a first storage location assigned to the first storage system node; and
  release, by the second storage system node, ownership of the storage space to the first storage system.

15. The system of claim 14, wherein the machine executable code further causes to:
  in response to detecting the first storage system node is unresponsive, copy by the second storage system node configuration information regarding the storage of the first system node from the first storage location to the second storage location.

16. The system of claim 14, wherein the machine executable code further causes to:
  prior to the second storage system node attempting to take over storage of the first storage system node, assign the first storage location to the first storage system node to point to an active file system of the first storage system node.

17. The system of claim 16, wherein the machine executable code further causes to:
  access the active file system of the first storage system node using information copied from the first storage location to the second storage location.

18. The system of claim 14, wherein the machine executable code further causes to:
  upon detecting a failure in the second storage system node while taking over the storage of the first storage system node, use a third storage system node for taking over storage of the second storage system node to complete taking over storage of the first storage system node.

19. The system of claim 14, wherein the machine executable code further causes to:
  allocate a third storage location for the second storage system node to track write requests for storage managed by the second storage system node.

20. The system of claim 14, wherein the machine executable code further causes to:
  allocate, by the second storage system node, storage space for storing data for a write request that would have been written by the first storage system node.

* * * * *